United States Patent
Hammarwall

(10) Patent No.: US 9,532,333 B2
(45) Date of Patent: Dec. 27, 2016

(54) METHOD AND SYSTEM FOR TRANSMISSION OF MUTING CONFIGURATIONS

(71) Applicant: Telefonaktiebolaget L M Ericsson (publ), Stockholm (SE)

(72) Inventor: David Hammarwall, Vallentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 110 days.

(21) Appl. No.: 14/395,275

(22) PCT Filed: May 10, 2013

(86) PCT No.: PCT/SE2013/000070
§ 371 (c)(1),
(2) Date: Oct. 17, 2014

(87) PCT Pub. No.: WO2013/169170
PCT Pub. Date: Nov. 14, 2013

(65) Prior Publication Data
US 2015/0131604 A1 May 14, 2015

Related U.S. Application Data

(60) Provisional application No. 61/646,073, filed on May 11, 2012.

(51) Int. Cl.
*H04W 4/00* (2009.01)
*H04W 72/04* (2009.01)
(Continued)

(52) U.S. Cl.
CPC ............ *H04W 72/04* (2013.01); *H04L 1/0026* (2013.01); *H04L 1/0077* (2013.01); *H04L 5/005* (2013.01);
(Continued)

(58) Field of Classification Search
CPC ...................................................... H04W 72/04
(Continued)

(56) References Cited

U.S. PATENT DOCUMENTS

| | | | | |
|---|---|---|---|---|
| 2010/0232373 | A1* | 9/2010 | Nory | ................. H04W 72/1289 370/329 |
| 2013/0021989 | A1* | 1/2013 | Tiirola | .................. H04L 5/0053 370/329 |

(Continued)

OTHER PUBLICATIONS

International Preliminary Report on Patentability issued in corresponding International application No. PCT/SE2013/000070, date of completion of the report Dec. 4, 2014.

(Continued)

*Primary Examiner* — Farah Faroul
(74) *Attorney, Agent, or Firm* — Patent Portfolio Builders PLLC

(57) ABSTRACT

Method and system for transmission of muting configurations involve a plurality of transmission configurations available for transmitting an information carrying signal from the transmitting node to the receiving node. The transmitting node determines a plurality of muting configurations and selects a transmission configuration. Each muting configuration corresponds to at least one transmission configuration. The transmitting node transmits a dynamic configuration message identifying the at least one muting configuration that corresponds to the selected transmission configuration to the receiving node and transmits the information carrying signal to the receiving node according to the selected transmission configuration. The receiving node receives the dynamic configuration message and the information carrying signal and decodes the received information carrying signal taking the at least one muting configuration into account.

29 Claims, 11 Drawing Sheets

(51) Int. Cl.
*H04L 1/00* (2006.01)
*H04L 5/00* (2006.01)
*H04L 25/03* (2006.01)
*H04B 7/02* (2006.01)
*H04B 7/04* (2006.01)

(52) U.S. Cl.
CPC .......... *H04L 5/0035* (2013.01); *H04W 72/042* (2013.01); *H04B 7/024* (2013.01); *H04B 7/0417* (2013.01); *H04L 5/003* (2013.01); *H04L 5/0007* (2013.01); *H04L 25/03898* (2013.01); *H04L 25/03949* (2013.01)

(58) Field of Classification Search
USPC ................................................ 370/252, 329
See application file for complete search history.

(56) References Cited

U.S. PATENT DOCUMENTS

| | | | | |
|---|---|---|---|---|
| 2013/0288731 A1* | 10/2013 | Chu | ........................ | H04B 7/024 455/509 |
| 2014/0029458 A1* | 1/2014 | Ye | ........................ | H04W 24/10 370/252 |
| 2014/0112248 A1* | 4/2014 | Bergman | ............... | H04B 7/024 370/328 |
| 2014/0126496 A1* | 5/2014 | Sayana | .................. | H04B 7/024 370/329 |
| 2014/0133419 A1* | 5/2014 | Nagata | .............. | H04W 72/1257 370/329 |
| 2014/0169275 A1* | 6/2014 | Nagata | .................. | H04W 16/14 370/328 |

OTHER PUBLICATIONS

International Search Report issued in corresponding International application No. PCT/SE2013/000070, date of mailing Oct. 7, 2013.
Written Opinion of the International Searching Authority issued in corresponding International application No. PCT/SE2013/000070, date of mailing Oct. 7, 2013.
Huawei et al., "Resources for Interference Measurements," 3GPP Draft; R1-120983, 3rd Generation Partnership Project (3GPP), Mobile Competence Centre; 650, Route des Lucioles; F-06921 Sophia-Antipolis Cedex, France, vol. RAN WG1, Jeju, Korea; Mar. 20, 2012, XP050599295.
Samsung, "Interference Measurement Resource for Downlink CoMP," 3GPP Draft; R1-121627, 3rd Generation Partnership Project (3GPP), Mobile Competence Centre; 650, Route des Lucioles; F-06921 Sophia-Antipolis Cedex, France, vol. RAN WG1, Jeju, Korea; Mar. 20, 2012, XP050599890.
New Postcom, "Design of PDSCH muting for CSI-RS in LTE Advanced," 3GPP Draft; R1-105223_Design of PDSCH Muting for CSI-RS in LTE-Advanced_Final, 3rd Generation Partnership Project (3GPP), Mobile Competence Centre; 650, Route des Lucioles; F-06921 Sophia-Antipolis Cedex, France, vol. RAN WG1, Xi'an, China; Oct. 4, 2010, XP050450328.

* cited by examiner

METHOD AND SYSTEM FOR TRANSMISSION OF MUTING CONFIGURATIONS

TECHNICAL FIELD

The present disclosure relates generally to methods and arrangements in a wireless communications system. In particular it relates to transmission and reception of information carrying signals in a wireless communication system wherein a plurality of transmission configurations is available for transmitting the information carrying signals.

BACKGROUND

In order to improve system performance, for example by improving the coverage of high data rates, improving the cell-edge throughput and/or increasing system throughput, Coordinated Multipoint (CoMP) transmission and/or reception may be used in a wireless communications system or radio access network. In the wireless communications system or cellular radio communications system wireless devices and/or user equipments, also known as mobile terminals and/or wireless terminals, communicate via a Radio Access Network (RAN) with one or more core networks. The user equipments may be mobile stations or user equipment units such as mobile telephones, also known as "cellular" telephones, and laptops with wireless capability, e.g., mobile termination, and may thus be, for example, portable, pocket, hand-held, computer-Included, or car-mounted mobile devices which communicate voice and/or data via the radio access network. A wireless device may be any equipment being wirelessly connectable to a RAN for wireless communication.

The radio access network covers a geographical area which is divided into point coverage areas, traditionally denoted cells, with each point coverage area or cell being served by a base station, e.g., a Radio Base Station (RBS), which in some networks is also called "eNB", "eNodeB", "NodeB" or "B node" and which in this document also is referred to as a base station or radio network node. A point coverage area is a geographical area where radio coverage is provided by a point, also referred to as a "transmission point" and/or a "reception point", which is controlled by the radio base station or radio network node at a base station site or radio network node site. A point coverage area is often also denoted a cell, but the concept of a cell also has architectural implications and the transmission of certain reference signals and system information. More specifically, multiple point coverage areas may jointly form a single logical cell sharing the same physical cell ID. However, in the following the notation of a "cell" is used interchangeably with "point coverage area" to have the meaning of the latter. Moreover, a point, or "transmission point" and/or a "reception point", corresponds in the present disclosure to a set of antennas covering essentially the same geographical area in a similar manner. Thus, a point might correspond to one of the sectors at a site, e g a base station site, but it may also correspond to a site having one or more antennae all intending to cover a similar geographical area. Often, different points represent different sites. Antennas correspond to different points when they are sufficiently geographically separated and/or have antenna diagrams pointing in sufficiently different directions.

The radio network node communicates over an air interface or radio interface with the user equipments within the range of the radio network node. One radio network node may serve one or more cells via one or more antennas operating on radio frequencies. The cells may be overlaid on each other, e g as macro and pico cells having different coverage areas, or adjacent to each other, e g as so called sector cells where the cells served by the radio network node each cover a section of the total area or range covered by the radio network node. The cells adjacent or overlaid relative to each other may alternatively or additionally be served by different or separate radio network nodes that may be co-located or geographically separated.

The one or more antennas controlled by the radio network node may be located at the site of the radio network node or at antenna sites that may be geographically separated from each other and from the site of the radio network node. There may also be one or more antennas at each antenna site. The one or more antennas at an antenna site may be arranged as an antenna array covering the same geographical area or arranged so that different antennas at the antenna site have different geographical coverage. An antenna array may also be co-located at one antenna site with antennas that have different geographical coverage as compared to the antenna array. In the subsequent discussion an antenna or antenna array covering a certain geographical area is referred to as a point, or transmission and/or reception point, or more specifically for the context of this disclosure as a Transmission Point (TP). In this context multiple transmission points may share the same physical antenna elements, but could use different virtualizations, e.g., different beam directions.

The communications, i e transmission and reception of signals between the radio access network and a user equipment, may be performed over a communication link or communication channel via one or more transmission and/or reception points that may be controlled by the same or different radio network nodes. A signal may thus, for example, be transmitted from multiple antennas by being transmitted via one transmission point from more than one antenna in an antenna array or by being transmitted via more than one transmission point from one antenna at each transmission point. The coupling between a transmitted signal and a corresponding received signal over the communication link may be modelled as an effective channel comprising the radio propagation channel, antenna gains, and any possible antenna virtualizations. Antenna virtualization is obtained by precoding a signal so that it can be transmitted on multiple physical antennae, possibly with different gains and phases. Link adaptation may be used to adapt transmission and reception over the communication link to the radio propagation conditions.

An antenna port is a "virtual" antenna, which is defined by an antenna port-specific reference signal. An antenna port is defined such that the channel over which a symbol on the antenna port is conveyed can be inferred from the channel over which another symbol on the same antenna port is conveyed. The signal corresponding to an antenna port may possibly be transmitted by several physical antennas, which may also be geographically distributed. In other words, an antenna port may be virtualized over one or several transmission points. Conversely, one transmission point may transmit one or several antenna ports.

Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

The Long Term Evolution (LTE) standard is currently evolving with enhanced MIMO support. A core component in LTE is the support of MIMO antenna deployments and MIMO related techniques. A current working assumption in LTE-Advanced, i e 3GPP Release-10, is the support of an eight-layer spatial multiplexing mode with possibly channel dependent precoding. The spatial multiplexing mode is aimed for high data rates in favourable channel conditions. An illustration of the spatial multiplexing mode is provided in FIG. 1. Therein, the transmitted signal, represented by an information carrying symbol vector a is multiplied by an $N_T \times r$ precoder matrix $W_{N_T \times r}$, which serves to distribute the transmit energy in a subspace of the $N_T$-dimensional vector space, corresponding to $N_T$ antenna ports. The precoder matrix is typically selected from a codebook of possible precoder matrices, and is typically indicated by means of a Precoder Matrix Indicator (PMI), which together with a Rank Indicator (RI) specifies a unique precoder matrix in the codebook. If the precoder matrix is confined to have orthonormal columns, then the design of the codebook of precoder matrices corresponds to a Grassmannian subspace packing problem. The r symbols in s each are part of a symbol stream, a so-called layer, and r is referred to as the rank or transmission rank. In this way, spatial multiplexing is achieved since multiple symbols can be transmitted simultaneously over the same Resource Element (RE) or Time-Frequency Resource Element (TFRE). The number of symbols r is typically adapted to suit the current channel properties.

LTE uses Orthogonal Frequency Division Multiplexing (OFDM) in the downlink, and Discrete Fourier Transform (DFT) precoded OFDM in the uplink. The basic LTE physical resource can be seen as a time-frequency grid, as illustrated in FIG. 2, where each time-frequency resource element (TFRE) corresponds to one subcarrier during one OFDM symbol interval, on a particular antenna port. The resource allocation in LTE is described in terms of resource blocks, where a resource block corresponds to one slot in the time domain and 12 contiguous 15 kHz subcarriers in the frequency domain. Two time-consecutive resource blocks represent a resource block pair, which corresponds to the time interval upon which scheduling operates.

The received $N_R \times 1$ vector $y_n$ for a certain resource element on subcarrier n or, worded differently, data RE number n or TFRE number n, assuming no inter-cell interference, is modeled by $$y_n = H_n W_{N_T \times r} s_n + e_n \quad (1)$$

where n denotes a transmission occasion in time and frequency, and $e_n$ is a noise and interference vector obtained as realizations of a random process. The precoder, or precoder matrix, for rank r, $W_{N_T \times r}$, can be a wideband precoder, which may be constant over frequency, or frequency selective.

The precoder matrix is often chosen to match the characteristics of the $N_R \times N_T$ MIMO channel $H_n$, also denoted channel matrix, resulting in so-called channel dependent precoding. When based on User Equipment (UE) feedback, this is also commonly referred to as closed-loop precoding and essentially strives for focusing the transmit energy into a subspace which is strong in the sense of conveying much of the transmitted energy to the UE or wireless device. In addition, the precoder matrix may also be selected to strive for orthogonalizing the channel, meaning that after proper linear equalization at the UE or wireless device, the inter-layer interference is reduced.

In closed-loop precoding, the UE or wireless device transmits, based on channel measurements in the forward link, i e the downlink, recommendations to the radio network node or base station of a suitable precoder to use. A single precoder that is supposed to cover a large bandwidth, so called wideband precoding, may be fed back. It may also be beneficial to match the frequency variations of the channel and instead feed back a frequency-selective precoding report, e.g. several precoders, one per subband. This is an example of the more general case of Channel State Information (CSI) feedback, which also encompasses feeding back other entities or information than precoders to assist the radio network node or base station in subsequent transmissions to the UE or wireless device. Such other information may include Channel Quality Indicators (CQIs) as well as Rank Indicator (RI).

In Release 8 and 9 of LTE the CSI feedback is given in terms of a transmission rank indicator (RI), a precoder matrix indicator (PMI), and channel quality indicator(s) (CQI). The CQI/RI/PMI report can be wideband or frequency selective depending on which reporting mode that is configured. This means that for CSI feedback LTE has adopted an implicit CSI mechanism where a UE does not explicitly report e.g., the complex valued elements of a measured effective channel, but rather the UE recommends a transmission configuration for the measured effective channel. The recommended transmission configuration thus implicitly gives information about the underlying channel state.

The RI corresponds to a recommended number of streams that are to be spatially multiplexed and thus transmitted in parallel over the effective channel. The PMI identifies a recommended precoder (in a codebook) for the transmission, which relates to the spatial characteristics of the effective channel. The CQI represents a recommended transport block size, i.e., code rate. There is thus a relation between a CQI and a Signal to Interference and Noise Ratio (SINR) of the spatial stream(s) over which the transport block is transmitted. Therefore, noise and interference estimates are important quantities when estimating, for example, the CQI, which is typically estimated by the UE or wireless device and used for link adaptation and scheduling decisions at the radio network node or base station side.

The term $e_n$ in (1) represents noise and interference in a TFRE and is typically characterized in terms of second order statistics such as variance and correlation. The interference can be estimated in several ways. For example it can be estimated as the residual noise and interference on the TFREs of the Cell Specific Reference Signal (CRS), after the known CRS sequence has been pre-subtracted, i.e., after the CRS has been cancelled. An illustration of CRS for Rel-8 of LTE can be seen in FIG. 3.

In LTE Release-10, a new reference symbol sequence was introduced, the Channel State Information Reference Signal (CSI-RS), intended to be used for estimating channel state Information. The CSI-RS provides several advantages over basing the CSI feedback on the CRS which were used, for that purpose, in previous releases. Firstly, the CSI-RS is not used for demodulation of the data signal, and thus does not require the same density. This means that the overhead of the CSI-RS is substantially less as compared to that of CRS. Secondly, CSI-RS provides a much more flexible means to configure CSI feedback measurements: For example, which CSI-RS resource to measure on can be configured in a UE specific manner. Moreover, antenna configurations larger than 4 antennas must resort to CSI-RS for channel measurements, since the CRS is only defined for at most 4 antennas.

A detailed example showing which resource elements within a resource block pair may potentially be occupied by UE-specific RS and CSI-RS is provided in FIG. 4. In this example, the CSI-RS utilizes an orthogonal cover code of length two to overlay two antenna ports on two consecutive REs. As seen, many different CSI-RS patterns are available. For the case of 2 CSI-RS antenna ports, for example, there are 20 different patterns within a subframe. The corresponding number of patterns is 10 and 5 for 4 and 8 CSI-RS antenna ports, respectively.

A CSI-RS resource may be described as the pattern of resource elements on which a particular CSI-RS configuration is transmitted. One way of determining a CSI-RS resource is by a combination of the parameters "resourceConfig", "subframeConfig", and "antennaPortsCount", which may be configured by Radio Resource Control (RRC) signaling.

Related to CSI-RS is the concept of zero-power CSI-RS resources, also known as a muted CSI-RS, that are configured just as regular CSI-RS resources, so that a UE knows that the data transmission is mapped around those resources. The intent of the zero-power CSI-RS resources is to enable the network to mute the transmission on the corresponding resources so as to boost the SINR of a corresponding non-zero power CSI-RS, possibly transmitted in a neighbor cell/transmission point. For Rel-11 of LTE, a special zero-power CSI-RS that a UE is mandated to use for measuring interference plus noise is under discussion. As the name indicates, a UE can assume that the TPs of interest are not transmitting on the muted CSI-RS resource and the received power can therefore be used as a measure of the interference plus noise level. For the purpose of improved interference measurements the agreement in LTE Release 11 is that the network will be able to configure a UE to measure interference on a particular interference Measurement Resource (IMR) that identifies a particular set of TFREs that is to be used for a corresponding interference measurement.

Based on a specified CSI-RS resource, that defines an effective channel for the data transmission, and an interference measurement configuration, e.g. a muted CSI-RS resource, the UE can estimate the effective channel and noise plus interference, and consequently also determine which rank, precoder and transport format to recommend that best match the particular effective channel.

CoMP transmission and reception refers to a system where the transmission and/or reception at multiple, geographically separated antenna sites is coordinated in order to improve system performance. More specifically, CoMP refers to coordination of antenna arrays that have different geographical coverage areas. The coordination between points can either be distributed, by means of direct communication between the different sites, or by means of a central coordinating node. A further coordination possibility is a "floating cluster" where each transmission point is connected to, and coordinates, a certain set of neighbors (e.g. two neighbors). A set of points that perform coordinated transmission and/or reception is referred to as a CoMP coordination cluster, a coordination cluster, or simply as a cluster in the following. In particular, a goal of using CoMP in a wireless communications network is to distribute the user perceived performance more evenly in the network by taking control of the interference in the system, either by reducing the interference and/or by better prediction of the interference. CoMP operation targets many different deployments, including coordination between sites and sectors in cellular macro deployments, as well as different configurations of Heterogeneous deployments, where for instance a macro node coordinates the transmission with pico nodes within the macro coverage area. In FIGS. 5-7 examples of wireless communications network deployments with CoMP coordination clusters comprising three transmission points, denoted TP1, TP2 and TP3 are shown. The term CoMP is sometimes understood to imply that different transmission points have different geographical locations. However, for the purposes of embodiments of this disclosure, the coordinated transmission aspect is relevant also for situations where transmission points involved in coordinated transmission have the same geographical location. For example, multiple transmission points may in this context share the same physical antenna elements, but could use different virtualizations, e.g., different beam directions, as mentioned in the earlier discussion about Transmission points herein. Although CoMP is referred to as an example in the following discussion of this disclosure, it is not to be understood as limiting for the applicability of the teachings herein.

There are many different CoMP transmission schemes that are considered; for example:

Dynamic Point Blanking where multiple transmission points coordinate the transmission so that neighboring transmission points may mute the transmissions on the time-frequency resources (TFREs) that are allocated to UEs that experience significant interference.

Coordinated Beamforming where the TPs coordinate the transmissions in the spatial domain by beamforming the transmission power in such a way that the interference to UEs served by neighboring TPs is suppressed.

Dynamic Point Selection where the data transmission to a UE may switch dynamically (In time and frequency) between different transmission points, so that the transmission points are fully utilized.

Joint Transmission where the signal to a UE is simultaneously transmitted from multiple TPs on the same time/frequency resource. The aim of joint transmission (JT) is to increase the received signal power and/or reduce the received interference, if the cooperating TPs otherwise would serve some other UEs without taking the JT UE into consideration.

A common denominator for the CoMP transmission schemes is that the network needs CSI information not only for the serving TP, but also for the channels linking the neighboring TPs to a terminal or UE. By, for example, configuring a unique CSI-RS resource per TP, a UE can resolve the effective channels for each TP by measurements on the corresponding CSI-RS. Note that the UE is likely unaware of the physical presence of a particular TP, it is only configured to measure on a particular CSI-RS resource, without knowing of any association between the CSI-RS resource and a TP.

Several different types of CoMP feedback are possible. Most alternatives are based on per CSI-RS resource feedback, possibly with CQI aggregation of multiple CSI-RS resources, and also possibly with some sort of co-phasing information between CSI-RS resources. The following is a non-exhaustive list of relevant alternatives (note that a combination of any of these alternatives is also possible):

Per CSI-RS resource feedback corresponds to separate reporting of channel state information (CSI) for each of a set of CSI-RS resources. Such a CSI report may, for example, comprise one or more of a Precoder Matrix Indicator (PMI), Rank Indicator (RI), and/or Channel Quality Indicator (CQI), which represent a recommended configuration for a hypothetical downlink transmission over the same antennas used for the associated CSI-RS, or the RS used for the channel measurement. More generally, the recommended transmission should be mapped to physical antennas in the same way as the reference symbols used for the CSI channel measurement.

Typically there is a one-to-one mapping between a CSI-RS and a TP, in which case per CSI-RS resource feedback corresponds to per-TP feedback; that is, a separate PMI/RI/CQI is reported for each TP. Note that there could be interdependencies between the CSI reports; for example, they could be constrained to have the same RI. Interdependencies between CSI reports have many advantages, such as; reduced search space when the UE computes feedback, reduced feedback overhead, and in the case of reuse of RI there is a reduced need to perform rank override at the eNodeB.

The considered CSI-RS resources are configured by the eNodeB as the CoMP Measurement Set. In the example shown in FIG. 5, different measurement sets may be configured for wireless devices 540 and 550. For example, the measurement set for wireless device 540 may consist of CSI-RS resources transmitted by TP1 and TP2, since these points may be suitable for transmission to device 540. The measurement set for wireless device 550 may instead be configured to consist of CSI-RS resources transmitted by TP2 and TP3. The wireless devices will report CSI information for the transmission points corresponding to their respective measurement sets, thereby enabling the network to e.g. select the most appropriate transmission point for each device.

Aggregate feedback corresponds to a CSI report for a channel that corresponds to an aggregation of multiple CSI-RS. For example, a joint PMI/RI/CQI can be recommended for a joint transmission over all antennas associated with the multiple CSI-RS.

A joint search may however be too computationally demanding for the UE, and a simplified form of aggregation is to evaluate an aggregate CQI which are combined with per CSI-RS resource PMIs, which should typically all be of the same rank corresponding to the aggregated CQI or CQIs. Such a scheme also has the advantage that the aggregated feedback may share much information with a per CSI-RS resource feedback. This is beneficial, because many CoMP transmission schemes require per CSI-RS resource feedback, and to enable eNodeB flexibility in dynamically selecting CoMP scheme, aggregated feedback would typically be transmitted in parallel with per CSI-RS resource feedback. To support coherent joint transmission, such per CSI-RS resource PMIs can be augmented with co-phasing information enabling the eNodeB to rotate the per CSI-RS resource PMIs so that the signals coherently combine at the receiver.

For efficient CoMP or coordinated transmission operation it is equally important to capture appropriate interference assumptions when determining the CQIs as it is to capture the appropriate received desired signal. Within a coordination cluster an eNodeB can to a large extent control which TPs that interfere a UE in any particular TFRE. Hence, there will be multiple interference hypotheses depending on which TPs are transmitting data to other terminals. In other words, the network can thus control the interference seen on a IMR, by for example muting all TPs within a coordination cluster on the associated TFREs, in which case the terminal will effectively measure the Inter CoMP cluster Interference. In the example shown in FIG. 5, this would correspond to muting TP1, TP2 and TP3 in the TFREs associated with the IMR. However, it is essential that an eNodeB can accurately evaluate the performance of a UE given different CoMP transmission hypotheses—otherwise the dynamic coordination becomes meaningless. Thus the system need to be able to track/estimate also different intra-cluster interference levels corresponding to different transmission and blanking hypotheses.

Consider for example a dynamic point blanking scheme, where there are at least two relevant interference hypotheses for a particular UE: in one interference hypothesis the UE sees no interference from the coordinated transmission point; and in the other hypothesis the UE sees interference from the neighbouring point. To enable the network to effectively determine whether or not a TP should be muted, the network may configure the UE to report two, or generally multiple, CSIs corresponding to different interference hypotheses. Continuing the example of FIG. 5, assume that the wireless device 550 is configured to measure CSI from TP3. However, there may potentially be an interfering transmission from TP2, depending on how the network schedules the transmission. Thus, the network may configure the device 550 for measuring the CSI-RS transmitted by TP3 for two interference hypotheses, the first one being that TP2 is silent, and the other one that TP2 is transmitting an interfering signal.

To harvest the gains of introducing coordinated transmission or CoMP feedback it is essential that a radio network node or base station, e g an eNodeB, can accurately predict the performance of a UE or wireless device for various coordinated transmission hypotheses, in order to select an appropriate downlink assignment. To this end, accurate interference measurements at a terminal are a key element for CSI reporting targeting different transmission hypotheses. However, current state of the art solutions for interference measurements are constrained by current standards and/or limitations imposed by UE specific muting of data channels, making accurate interference measurements difficult, in particular for CoMP systems employing dynamic point selection and/or joint transmission, where the transmission point association to a UE varies dynamically in time. Furthermore, it is essential that when the transmission configuration, e g the transmission point association, to the UE varies dynamically in time, the UE is still capable of correctly decoding received transmissions.

Thus, there is a need for improved handling of muting configurations, such as UE specific muting of data channels when different transmission configurations are available for transmitting information carrying signals in a wireless communications system.

SUMMARY

It is therefore an object of at least some embodiments of the present disclosure to improve the possibilities for correctly decoding received information carrying signals at a receiving node when different transmission configurations are available for transmitting the information carrying signals in a wireless communications system. It is a further object to improve the possibilities of UE specific muting of data channels for CoMP transmission in a wireless communications system.

According to a first aspect, these and other objects are achieved by a method in a receiving node for receiving an information carrying signal that is transmitted to the receiving node by a transmitting node. The receiving and transmitting nodes are comprised in a wireless communications system. A plurality of transmission configurations is available for transmitting said information carrying signal to said receiving node. The method comprises receiving a dynamic configuration message from the transmitting node. The dynamic configuration message identifies, to said receiving node, at least one muting configuration among a plurality of possible muting configurations. The method further comprises receiving said information carrying signal from the transmitting node and decoding said received information carrying signal taking said at least one muting configuration into account. The at least one muting configuration is taken into account by assuming that no information expected to be decoded by the receiving node is transmitted on Time-Frequency Resource Elements, TFREs, identified as muted by said at least one muting configuration.

According to a second aspect, these and other objects are achieved by a method in a transmitting node for transmitting an information carrying signal to a receiving node. The receiving and transmitting nodes are comprised in a wireless communications system. A plurality of transmission configurations is available for transmitting said information carrying signal to said receiving node. The method comprises determining a plurality of muting configurations. Each muting configuration in said plurality of muting configurations corresponds to at least one transmission configuration in said plurality of transmission configurations. The method comprises selecting a transmission configuration from said plurality of transmission configurations for transmitting said information carrying signal to said receiving node and transmitting a dynamic configuration message to said receiving node. The dynamic configuration message identifies, to said receiving node, the at least one muting configuration out of said plurality of muting configurations that corresponds to said selected transmission configuration. The method further comprises transmitting said information carrying signal to said receiving node in a transmission according to said selected transmission configuration, wherein the transmission is muted in accordance with the identified at least one muting configuration.

According to a third aspect, these and other objects are achieved by a receiving node for receiving an information carrying signal from a transmitting node. The receiving node is configurable to communicate with the transmitting node in a wireless communications system. A plurality of transmission configurations is available for transmitting said information carrying signal to said receiving node. The receiving node comprises radio circuitry and processing circuitry. The processing circuitry is configured to receive a dynamic configuration message from the transmitting node via said radio circuitry. The dynamic configuration message identifies, to said receiving node, at least one muting configuration among a plurality of possible muting configurations. The processing circuitry is further configured to receive said information carrying signal from the transmitting node via said radio circuitry, and to decode said received information carrying signal taking said at least one muting configuration into account. The at least one muting configuration is taken into account by assuming that no information expected to be decoded by the receiving node is transmitted on Time-Frequency Resource Elements, TFREs, identified as muted by said at least one muting configuration.

According to a fourth aspect, these and other objects are achieved by a transmitting node for transmitting an information carrying signal to a receiving node. The transmitting node is configured to be connectable to radio circuitry for communicating with the receiving node. The transmitting node is thus configurable to communicate with the receiving node in a wireless communications system. A plurality of transmission configurations are available for transmitting said information carrying signal via said radio circuitry to said receiving node. The transmitting node comprises processing circuitry configured to determine a plurality of muting configurations. Each muting configuration in said plurality of muting configurations corresponds to at least one transmission configuration in said plurality of transmission configurations. The processing circuitry is further configured to select a transmission configuration from said plurality of transmission configurations for transmitting said information carrying signal to said receiving node. The processing circuitry is further configured to transmit a dynamic configuration message to said receiving node via said radio circuitry. The dynamic configuration message identifies, to said receiving node, the at least one muting configuration out of said plurality of muting configurations that corresponds to said selected transmission configuration. The processing circuitry is further configured to transmit, via said radio circuitry, the information carrying signal to said receiving node in a transmission according to the selected transmission configuration, wherein the transmission is muted in accordance with the identified at least one muting configuration.

The above objects are achieved since a plurality of muting configurations are determined by the transmitting node and at least one muting configuration corresponds to a selected transmission configuration used by the transmitting node for transmitting an information carrying signal to the receiving node that has been informed in a dynamic configuration message about the at least one muting configuration so that it can be applied when decoding the received information carrying signal, thereby enabling the receiving node to correctly decode received information carrying signals.

Furthermore, the possibilities of having muting configurations, e g for muting of data channels for CoMP transmission, that are specific to a receiving node, such as a UE, are improved when the muting configuration applied at the receiving node is brought in correspondence with the muting configurations applied by the transmission points involved in the selected transmission configuration through the dynamic configuration message.

An effect of the methods is that link adaptation and CSI reporting is improved in the wireless system when the muting configurations of receiving nodes are brought in accordance with muting configurations applied at different transmission points from which the information carrying signal is transmitted to the receiving nodes.

Moreover, the interference measurements may be made to better reflect the performance when there is actual intra-cluster interference present without bias imposed by varying traffic load in the system. This will translate to improved link adaptation and spectral efficiency in the wireless system.

DETAILED DESCRIPTION

Figure 1:
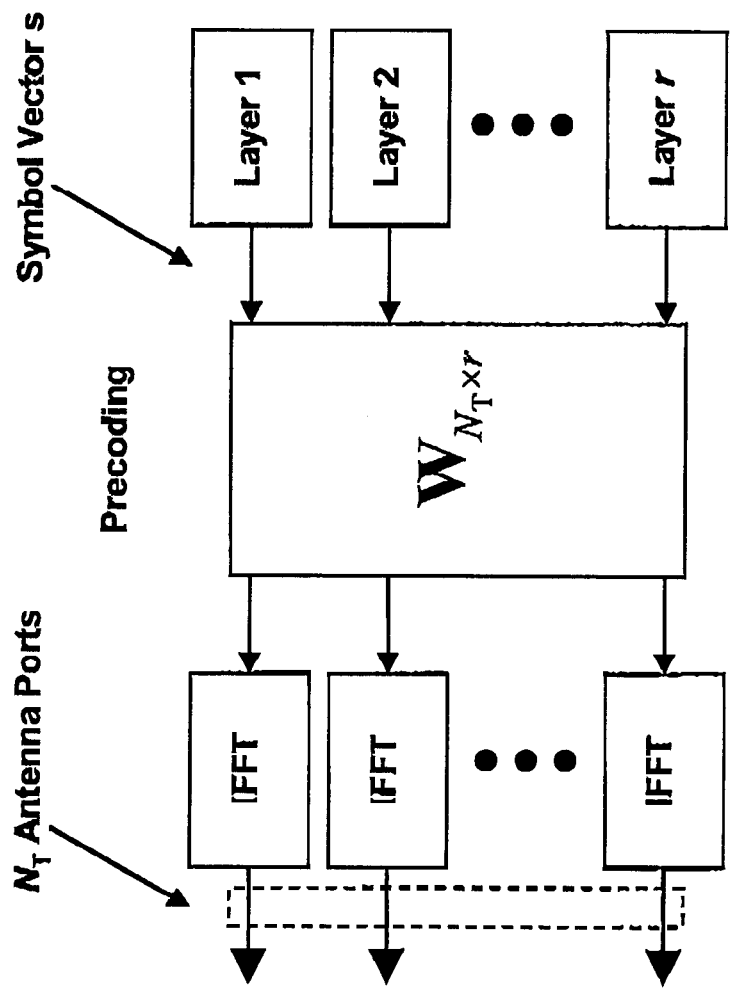
FIG. 1 is a schematic block diagram illustrating the transmission structure of the precoded spatial multiplexing mode in LTE.
Figure 2:
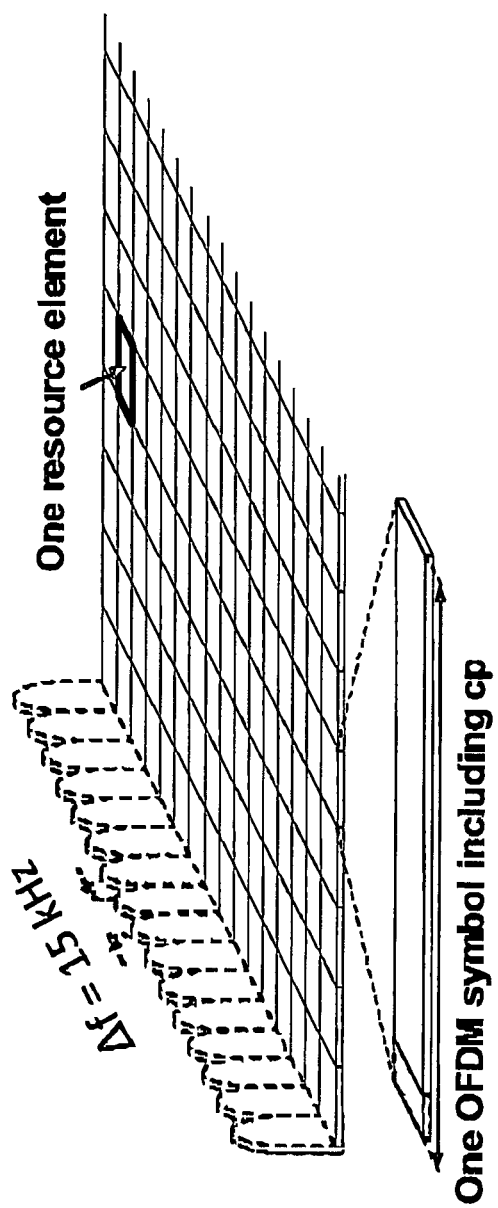
FIG. 2 is a schematic diagram illustrating the LTE time-frequency resource grid.
Figure 3:
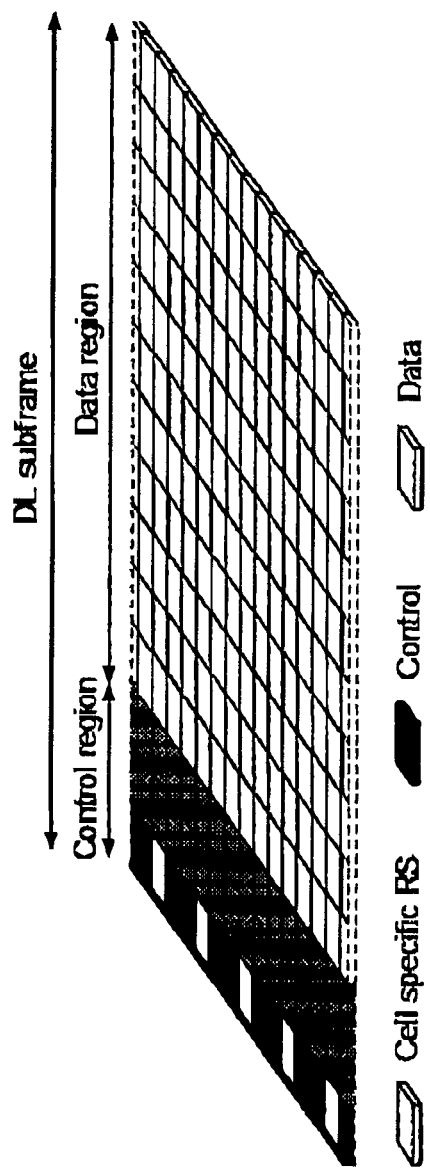
FIG. 3 is a schematic diagram illustrating cell-specific reference signals.
Figure 4:
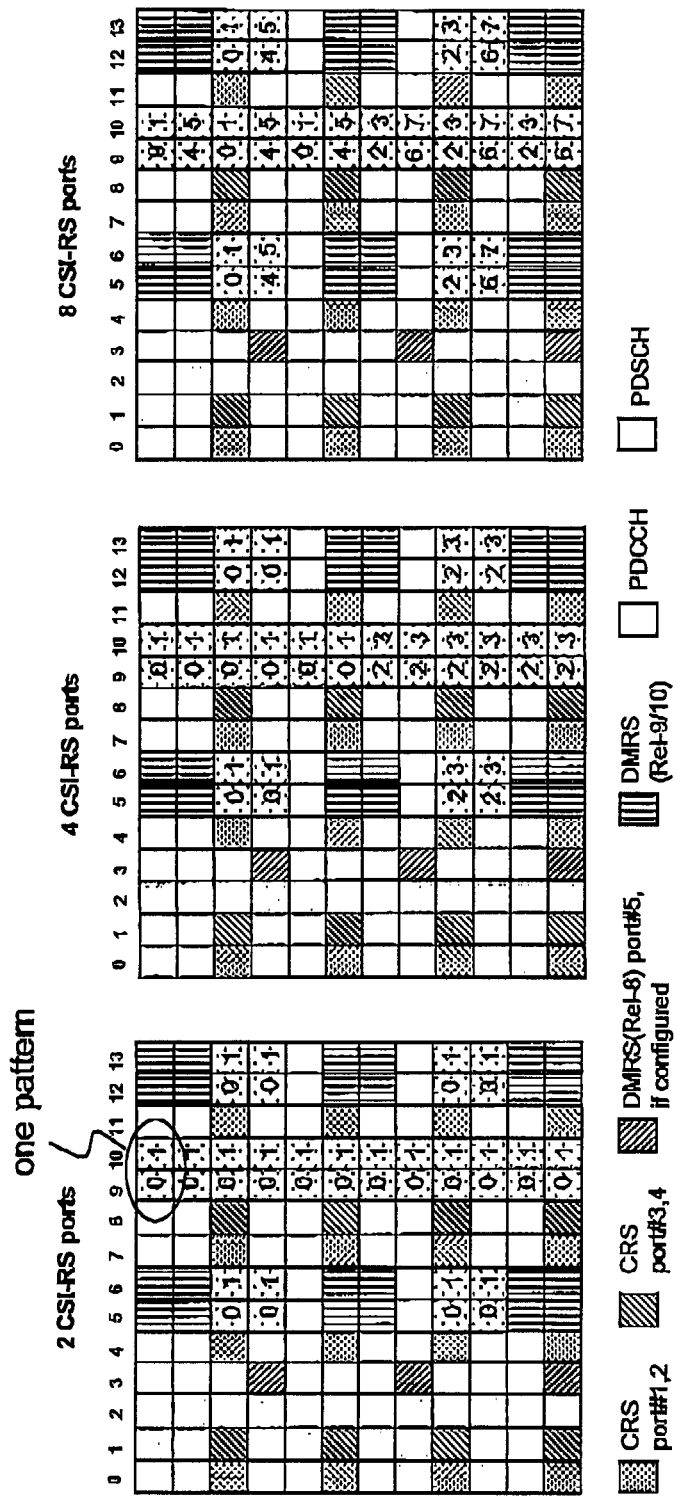
FIG. 4 is a schematic diagram showing example layouts of reference signals.

In this section, the invention will be illustrated in more detail by some exemplary embodiments. It should be noted that these embodiments are not mutually exclusive. Components from one embodiment may be tacitly assumed to be present in another embodiment and it will be understood by a person skilled in the art how those components may be used in the other exemplary embodiments.

It should be noted that although terminology from 3rd Generation Partnership Project (3GPP) LTE has been used in this disclosure to exemplify the invention, this should not be seen as limiting the scope of the invention to only the aforementioned system. Other wireless systems, including Wideband Code Division Multiple Access (WCDMA), Worldwide Interoperability for Microwave Access (Wi-Max), Ultra Mobile Broadband (UMB) and Global System for Mobile Communications (GSM) systems, may also benefit from exploiting the ideas covered within this disclosure.

Further, terminology such as eNodeB and UE should be considered as non-limiting and does in particular not imply a certain hierarchical relation between the two; in general the term "eNodeB" or base station could be considered as a first device, first node or transmitting node and the term "UE" could be considered as a second device, second node or receiving node, and these two devices communicate with each other over a radio channel that may be of various types, for example a multiple-Input-multiple-output, "MIMO" channel. Herein, we also focus on wireless transmissions in the downlink, i e from the eNodeB to the UE, but the teachings of the embodiments described herein are equally applicable in the uplink, i e from the UE to the eNodeB. Thus, in such embodiments the receiving node may be the eNodeB or base station and the transmitting node may be the UE.

As mentioned above, interference measurement resources (IMRs), are adopted by the LTE standard to enable the network to better control the interference measurements in the UEs. By muting a particular set of transmission points on a corresponding IMR a UE will only measure the residual interference caused by any non-muted transmission point in the vicinity. Hence, in a coordinated cluster of transmission points, the IMR is a powerful tool for measuring the uncontrolled residual interference outside of the coordinated cluster, when all coordinated transmission points are muted on the resource elements of the IMR. However, to select a transmission configuration for a UE, the system needs to be able to track/estimate also different intra-cluster interference levels corresponding to different transmission and blanking hypotheses. It has therefore been proposed to allow configuration of multiple distinct IMRs, wherein the network is responsible for realizing different relevant (Intra-cluster) interference hypotheses in the different IMRs, e.g., by muting the data transmissions accordingly on different transmission points, and that a UE should be able to perform multiple interference measurements, corresponding to different intra-cluster interference hypotheses, by means of configuring multiple IMRs; thus enabling CQI reporting for the different interference hypotheses. Hence, by associating a particular reported CQI with a particular IMR the relevant CQIs can be made available to the network for effective scheduling.

The network would thus be responsible for configuring the transmissions so that the interference measured on the different IMRs corresponds to the desired interference hypotheses; that is, for each IMR a set of transmission points will be muted, and intra-cluster interference only from the remaining coordinated (and un-coordinated) transmission points will be present on the IMR.

Figure 8:
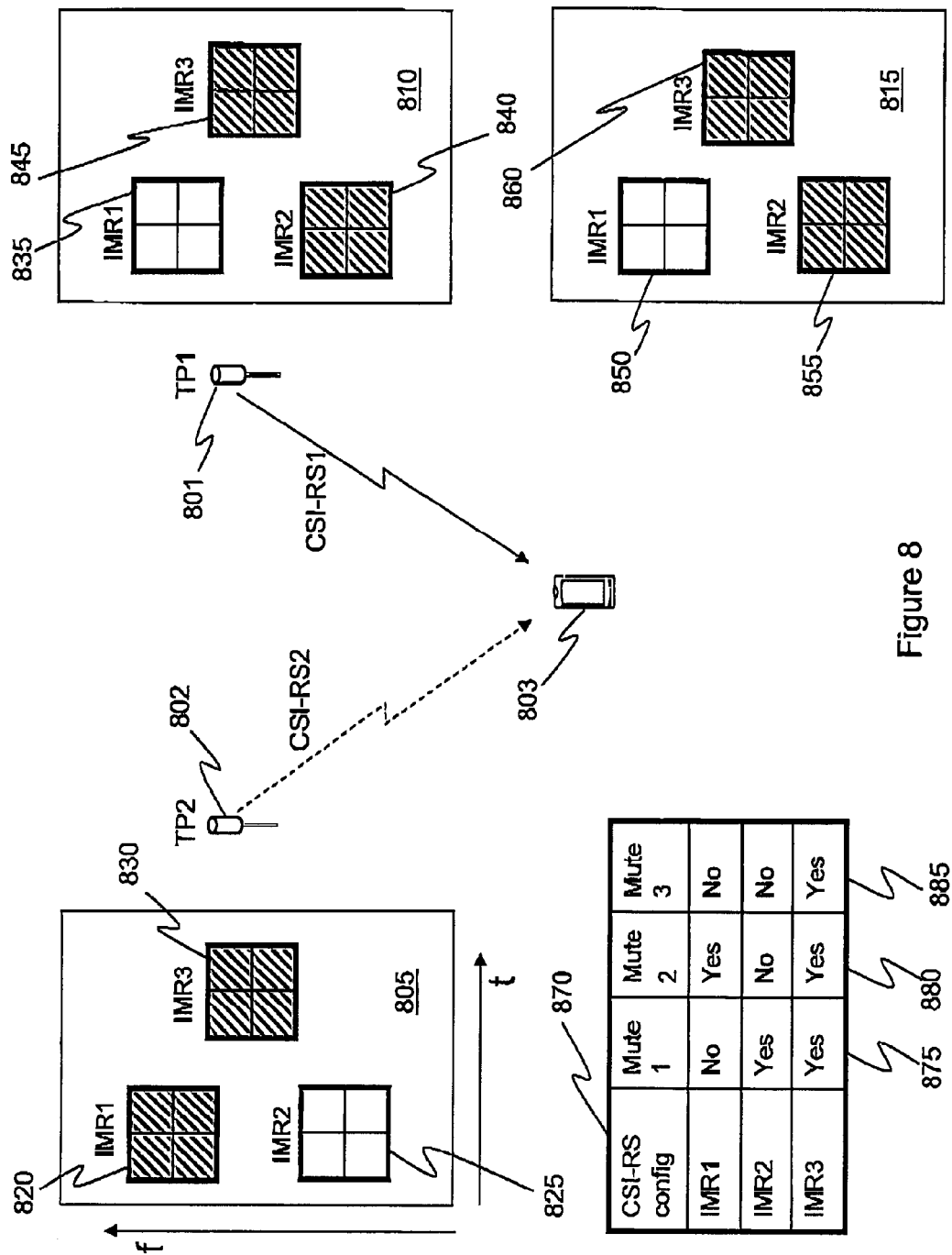
FIG. 8 is a schematic diagram illustrating a scenario in a coordination cluster in a wireless network.

The inventors have realized that in systems, where the transmission to a specific UE involves, or changes between, multiple transmission points, such as systems operating with dynamic point selection and/or joint transmission, i e transmission from multiple transmission points, there will be a mismatch between a configured muting pattern specific to the UE, and one of the potentially different targeted muting patterns of two different involved transmission points. This situation is illustrated in FIG. 8, where a UE 803 has been configured with a muting configuration 815 by the network, e g in RRC signalling, wherein the UE 803 should expect TFREs comprised in IMR2 855 and IMR3 880 to be muted, whereas the UE 803 should expect that transmissions may occur on IMR1 850. The UE 803 is currently connected to the network via TP1 801. This transmission point has been configured by the network with a muting configuration 810 according to which transmissions are muted on IMR2 840 and IMR3 845 whereas transmissions may occur on IMR1 835. As this is also the muting configuration of the UE 803, the UE 803 will be able to demodulate/decode codewords that are mapped around the muted TFREs of IMR2 and IMR3. If, however, the connection of the UE 803 to the network switches to TP2 802, there will be a mismatch between the muting configuration 805 of TP2 802 and the muting configuration 815 of the UE 803. For example, UE 803 will expect transmissions on the TFREs of IMR1 850, whereas according to the muting configuration 806 of TP2 802 IMR1 820 will be muted. This means that UE 803 will not be able to demodulate/decode codewords that are mapped around the muted TFREs of IMR1, meaning that the UE 803 will then not be able to interpret the transmitted information anymore. If, on the other hand, TP2 802 would then transmit on IMR1 820, it would change the results of measurements made by other UEs on IMR1 820 so that these measurements would no longer give adequate information for CSI reporting. This would deteriorate link adaptation and degrade the overall performance and spectral efficiency of the network.

According to embodiments of this disclosure, this situation is avoided by dynamically configuring a UE with a muting configuration applicable for the selected transmit configuration. This means that depending on what transmission point or points are selected for transmissions to the UE, the UE is configured by a radio network node, such as an eNodeB, with a dynamically configurable data/control muting pattern, i e a set of TFREs that the UE should expect to be muted, that is compatible with the muting pattern or patterns of the one or more transmission points. This may for example be implemented in form of a table 870 of muting configurations 875, 880, 885 where each muting configuration is applicable to at least one transmit configuration. In the example of FIG. 8 muting configuration Mute1 875 corresponds to a transmit configuration where transmissions to the UE 803 are transmitted from TP1 801, muting configuration Mute2 880 corresponds to a transmit configuration where transmissions to the UE 803 are transmitted from TP2 802, and muting configuration Mute3 885 corresponds to a transmit configuration where transmissions to the UE 803 are transmitted from TP1 801 and TP2 802. In this latter case, the UE 803 should thus assume that no muting is made on IMR1 835 and IMR2 825, whereas IMR3 is muted, as neither TP1 801 nor TP2 802 transmits on IMR3 830, 845.

By dynamic signalling to the UE, e.g., by indication by bits in a Downlink Control Information (DCI) format on PDCCH, an indicator of the muting configuration or configurations that determines which resource elements that should be assumed muted in, for example, a downlink data transmission, the muting pattern may be adjusted to match a desired muting pattern for the specific transmission point (s) that are transmitting to the UE in a given instance. This resolves the problem of mismatches between a UE specific muting configuration and the desired muting patterns for a specific transmission point.

Another difficulty when operating coordinated transmission and reception, e g CoMP, in coordination clusters where different transmission points belong to different cells is that the different transmission points may, firstly transmit CRS on different sets of TFREs, a g corresponding to different CRS configurations comprising different CRS shifts and number of CRS antenna ports, and secondly may have different PDCCH regions; that is, the number of initial OFDM symbols that are devoted to the PDCCH may be different. This becomes challenging when the PDSCH transmission to a UE that is connected to a single serving cell of one of the transmission points, is switched to a neighboring transmission point, since the PDSCH then may collide with the PDCCH and the CRS transmitted by that neighboring transmission point. These problems are also alleviated by embodiments of this disclosure.

Figure 5:
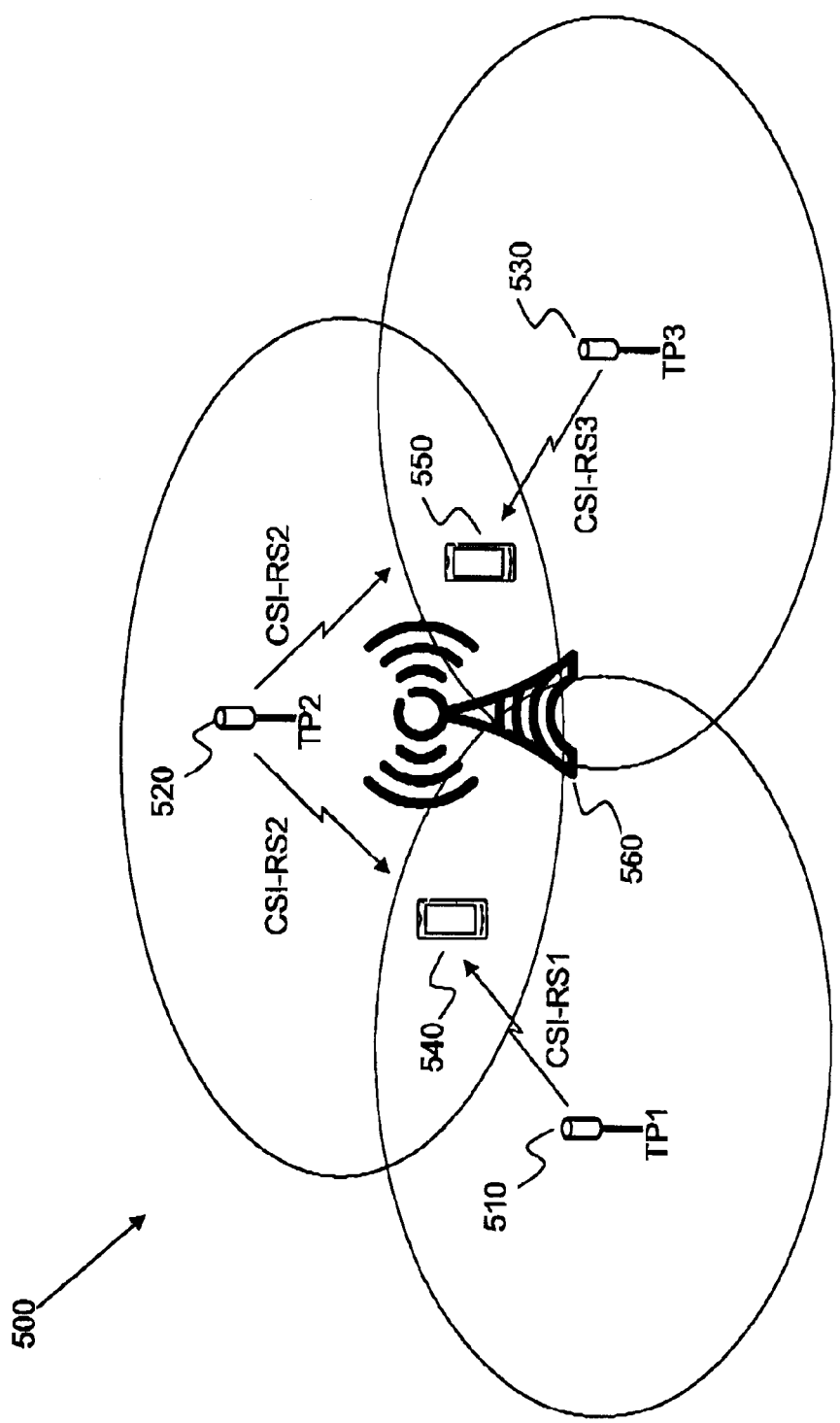
FIG. 5 is a schematic diagram illustrating a coordination cluster in a wireless network.

FIG. 5 illustrates an example wireless communications system 500 in which various embodiments of the invention may be implemented. The three transmission points 510, 520 and 530 form a CoMP coordination cluster. In the following, for purposes of Illustration and not limitation, it will be assumed that the communications system 500 is an LTE system. Transmission points 510, 520 and 530 are remote radio units (RRU:s), controlled by eNodeB 560. In an alternative scenario (not shown), the transmission points could be controlled by separate eNodeBs. It should be appreciated that, generally speaking, each network node, e.g. eNodeB, may control one or more transmission points, which may either be physically co-located with the network node, or geographically distributed. In the scenario shown in FIG. 5, it is assumed that the transmission points 510, 520 and 530 are connected to eNodeB 560, e.g. by optical cable or a point-to-point microwave connection. In the case where some or all of the transmission points forming the cluster are controlled by different eNodeBs, those eNodeBs would be assumed to be connected with each other e.g. by means of a transport network, to be able to exchange information for possible coordination of transmission and reception.

It should be appreciated that although examples herein refer to an eNodeB for purposes of illustration, the invention applies to any network node. The expression "network node" as used in this disclosure is intended to encompass any radio base station, e.g. an eNodeB, NodeB, Home eNodeB or Home NodeB, or any other type of network node that controls all or part of a CoMP cluster.

The communications system 500 further comprises two wireless devices 540 and 550. Within the context of this disclosure, the term "wireless device" encompasses any type of wireless node which is able to communicate with a network node, such as a base station, or with another wireless device by transmitting and/or receiving wireless signals. Thus, the term "wireless device" encompasses, but is not limited to: a user equipment, a mobile terminal, a stationary or mobile wireless device for machine-to-machine communication, an integrated or embedded wireless card, an externally plugged in wireless card, a dongle etc. The wireless device may also be a network node, e.g. a base station. Throughout this disclosure, whenever the term "user equipment" is used this should not be construed as limiting, but should be understood as encompassing any wireless device as defined above.

A reference signal resource comprises a set of resource elements in which one or more reference signals corresponding to a desired signal are received. In particular embodiments the reference signal resource is a CSI-RS resource. However, the reference signal resource may be any other type of RS resource which may be used to estimate a desired signal, e.g. a CRS resource.

More generally, some embodiments provide a method in a receiving node for receiving an information carrying signal, as will now be described with reference to FIG. 5 and the flowchart of FIG. 9. The information carrying signal is transmitted to the receiving node 540 by a transmitting node 560. The receiving node 540 and the transmitting node 560 are comprised in a wireless communications system 500. A plurality of transmit configurations, also denoted transmission configurations, are available for transmitting the information carrying signal to the receiving node 540. A transmit configuration may involve transmission from one or more transmission points 510, 520, 530 controlled by the transmitting node 560. Other transmit configurations may in addition involve at least one transmission point controlled by a neighboring transmitting node. The receiving node 540 may for example be a UE or a wireless device. The transmitting node 560 may for example be a radio network node such as an eNodeB. The wireless communications system 500 may in some embodiments be configured to apply Coordinated Multipoint Transmission for transmissions to the receiving node 540. At least some of the plurality of transmit configurations may then be provided for by CoMP transmission. The receiving node 540 may be configured for or capable of feeding back CSI for CoMP transmission.

In step 910 the receiving node 540 receives a dynamic configuration message from the transmitting node 560. The dynamic configuration message identifies at least one muting configuration to the receiving node, among a plurality of possible muting configurations. The plurality of muting configurations may comprise muting configurations that cover time-frequency resource elements (TFREs) that are zero-power CSI-RS configurable, i.e. which can be configured as zero-power CSI-RS configurations. Additionally or alternatively the plurality of muting configurations may comprise at least one muting configuration that covers TFREs of at least one CRS configuration. Furthermore, the plurality of muting configurations may comprise at least one muting configuration that covers all TFREs of an OFDM symbol. In some embodiments a muting configuration that covers TFREs that are zero-power CSI-RS configurable may in addition cover TFREs of at least one CRS configuration and/or all TFREs of an OFDM symbol.

In some embodiments the at least one muting configuration may be identified by an indicator in the dynamic configuration message. The indicator may comprise one or more bits in a Downlink Control Information, DCI, format. The at least one muting configuration may comprise a zero-power Channel State Information Reference Signal, CSI-RS, configuration. According to some embodiments the at least one muting configuration may additionally or alternatively cover TFREs of at least one Cell Specific Reference Signal, CRS, configuration and/or all TFREs of an Orthogonal Frequency Division Multiplexing, OFDM, symbol.

In step 920 the receiving node 540 receives the information carrying signal from the transmitting node 560. The information carrying signal may be received from the transmitting node 560 in a coordinated transmission via one or more transmission points 510, 520, 530. The transmission points may in some embodiments be controlled by the transmitting node 560. In other embodiments, at least one of the one or more transmission points may be controlled by a neighboring transmitting node. The coordinated transmission may in some embodiments be a Coordinated Multi-Point transmission. The information carrying signal may for example be a downlink data and/or control transmission.

In step 930 the receiving node 540 decodes the received information carrying signal taking the at least one muting configuration into account. To take the at least one muting configuration into account the receiving node 540 assumes that no information that is expected to be decoded by the receiving node 540 is transmitted on Time-Frequency Resource Elements, TFREs, that are identified as muted by the at least one muting configuration. According to some embodiments the at least one muting configuration Identified in the dynamic configuration message received from the transmitting node 560 in a current subframe may be applied by the receiving node 540 for decoding of the information carrying signal in the current subframe.

The at least one muting configuration may in some examples be a dynamic muting pattern of time-frequency resource elements on which the receiving node 640 may assume that a data and/or control signal is not transmitted. In such examples, the muting pattern is dynamic in that it is a muting pattern of TFREs that has been adjusted by the transmitting node 560 to match a desired muting pattern for one or more specific transmission points that are transmitting to the receiving node 540 in a given instance. The given instance may be a current subframe in which the dynamic configuration message is received from the transmitting node 560 and wherein the muting pattern is applied for decoding of the information carrying signal in the current subframe.

Figure 6:
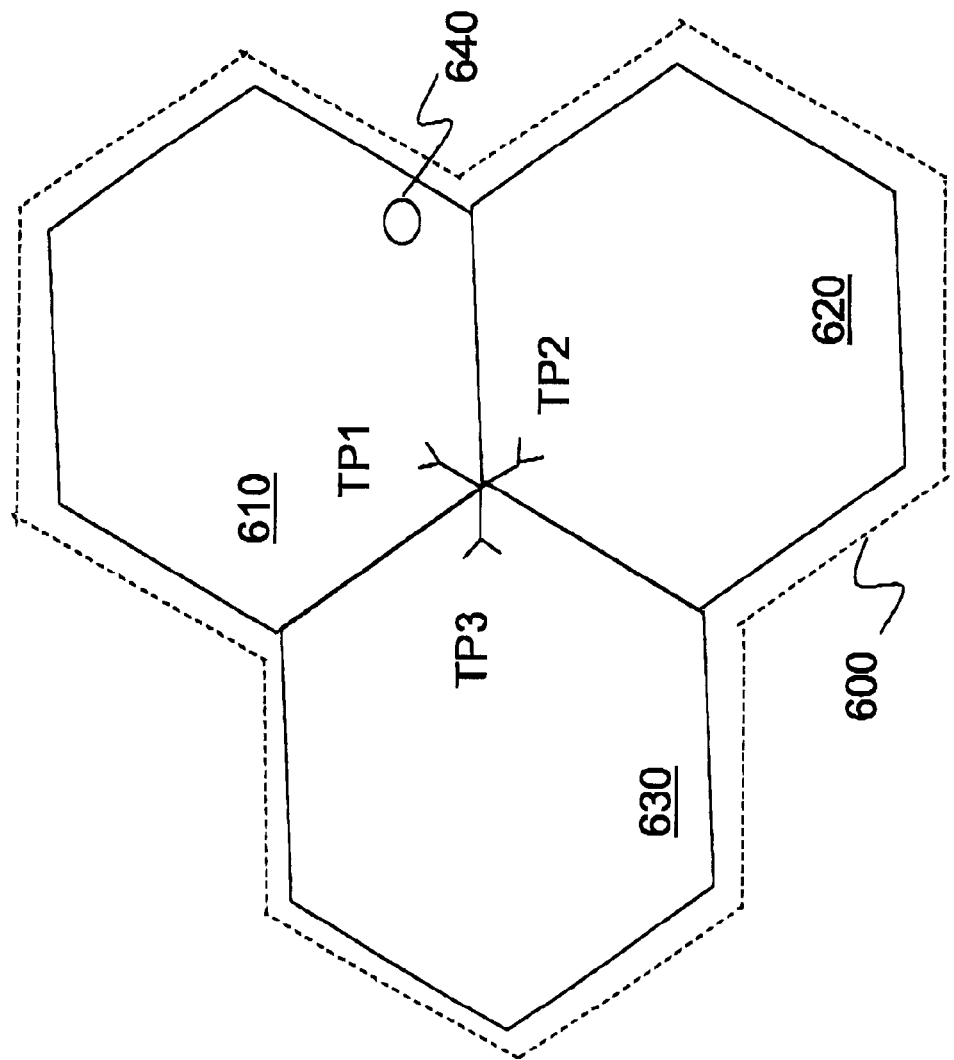
FIG. 6 is a schematic diagram illustrating a coordination cluster in a wireless network.
Figure 7:
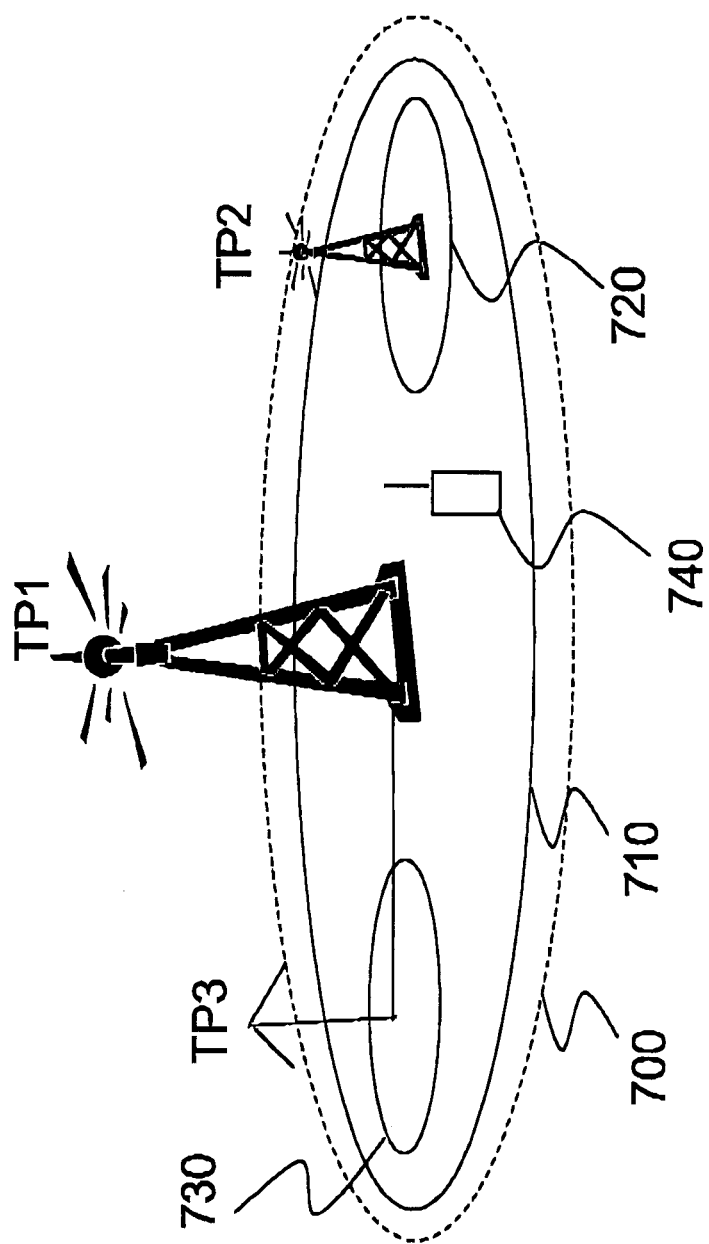
FIG. 7 is a schematic diagram illustrating a coordination cluster in a wireless network.

Further embodiments provide a method in a transmitting node for transmitting an Information carrying signal, as will now be described with reference to FIG. 5 and the flowchart of FIG. 9. This method corresponds to the receiving node method described above with reference to the same FIGS. 5 and 9. The transmitting node is comprised in or controls a cluster for coordinated multipoint transmission, e.g. the cluster TP1-TP3 shown in FIG. 5. More generally, the transmitting node is associated with the cluster. As a particular example, the transmitting node may be the eNodeB 560 controlling TP1-TP3, which are remote radio heads. In an alternative scenario, such as that shown in FIG. 6, the transmitting node is an eNodeB with three sector antennas which correspond to transmission points TP1-TP3, forming a CoMP cluster 800 wherein a receiving node 640 is located. In yet another scenario, as shown in FIG. 7, TP1-TP3 may form a CoMP cluster 700 wherein a receiving node 740 is located, and the transmitting node may either be the eNodeB controlling TP1 and TP3, or the eNodeB controlling TP2, and serving pico cell 720.

In the method, the information carrying signal is transmitted to a receiving node 540 by the transmitting node 560. The receiving node 540 and the transmitting node 560 are comprised in a wireless communications system 500. A plurality of transmit configurations, also denoted transmission configurations, are available for transmitting the information carrying signal to the receiving node 540. A transmit configuration may involve transmission from one or more transmission points 510, 520, 530 controlled by the transmitting node 560. Other transmit configurations may in addition involve at least one transmission point controlled by a neighboring transmitting node. The receiving node 540 may for example be a UE or a wireless device. The transmitting node 560 may for example be a radio network node such as an eNodeB. The wireless communications system 500 may in some embodiments be configured to apply Coordinated Multipoint Transmission for transmissions by the transmitting node 560. At least some of the plurality of transmit configurations may then be provided for by CoMP transmission. The receiving node 640 may be configured for or capable of feeding back CSI for CoMP transmission.

In step 940 the transmitting node 560 determines a plurality of muting configurations. Each muting configuration in the plurality of muting configurations corresponds to or may be associated with at least one transmit configuration in the plurality of transmit configurations. The plurality of muting configurations may comprise muting configurations that cover time-frequency resource elements (TFREs) that are zero-power CBI-RS configurable, i.e. which can be configured as zero-power CSI-RS configurations. Additionally or alternatively the plurality of muting configurations may comprise at least one muting configuration that covers TFREs of at least one CRS configuration. Furthermore, the plurality of muting configurations may comprise at least one muting configuration that covers all TFREs of an OFDM symbol. In some embodiments a muting configuration that covers TFREs that are zero-power CSI-RS configurable may in addition cover TFREs of at least one CRS configuration and/or all TFREs of an OFDM symbol. In some embodiments each transmit configuration in the plurality of transmit configurations is associated with one or more muting configurations in said plurality of muting configurations. The plurality of muting configurations may in some embodiments correspond to a plurality of downlink transmission hypotheses for which the receiving node 540 may have been requested to report CSI information.

In step 950 the transmitting node 560 selects a transmit configuration from the plurality of transmit configurations for transmitting the information carrying signal to the receiving node 540. The transmit configuration may in some embodiments be selected based on reported CSI information from the receiving node 540. The selected transmit configuration may correspond to a specific one of the plurality of downlink transmission hypotheses.

In step 960 the transmitting node 560 transmits a dynamic configuration message to the receiving node 540. The dynamic configuration message identifies at least one muting configuration out of the plurality of muting configurations to the receiving node 540. The at least one muting configuration corresponds to or is associated with the selected transmit configuration. In some embodiments the at least one muting configuration may be identified by an indicator in the dynamic configuration message. The indicator may comprise one or more bits in a Downlink Control information, DCI, format. The at least one muting configuration may comprise a zero-power Channel State Information Reference Signal, CSI-RS, configuration. According to some embodiments the at least one muting configuration may additionally or alternatively cover TFREs of at least one Cell Specific Reference Signal, CRS, configuration and/or all TFREs of an Orthogonal Frequency Division Multiplexing, OFDM, symbol.

In step 970 the transmitting node 560 transmits the information carrying signal to the receiving node 540 in a transmission according to the selected transmit configuration. The transmission is muted in accordance with the identified at least one muting configuration, or in other words in accordance with the at least one muting configuration associated with the selected transmit configuration. According to some embodiments the at least one muting configuration identified in the dynamic configuration message transmitted by the transmitting node 560 in a current subframe may be intended to be applied by the receiving node 540 for decoding of the information carrying signal in the current subframe. In some examples the at least one muting configuration may be a dynamic muting pattern of time-frequency resource elements on which the receiving node 540 may assume that a data and/or control signal is not transmitted. In such examples, the muting pattern is dynamic in that it is a muting pattern of TFREs that may be adjusted by the transmitting node 560 to match a desired muting pattern for one or more specific transmission points that are transmitting to the receiving node 540 in a given instance. The given instance may be a current subframe in which the dynamic configuration message is transmitted by the transmitting node 560 and wherein the muting pattern is to be applied by the receiving node 540 for decoding of the information carrying signal in the current subframe.

The information carrying signal may be transmitted by the transmitting node 560 in a coordinated transmission via one or more transmission points 510, 520, 530. The transmission points may in some embodiments be controlled by the transmitting node 550. In other embodiments, at least one of the one or more transmission points may be controlled by a neighboring transmitting node. The coordinated transmission may in some embodiments be a Coordinated Multi-Point transmission. The information carrying signal may be a downlink data and/or control signal.

When the methods illustrated above are implemented in a wireless communications system according to the LTE standard, the receiving node 540 may be a User Equipment, UE, served by a serving cell and the transmitting node 560 may be an eNodeB. The at least one muting configuration may then be determined from the indicator transmitted by the eNodeB and received by the UE in the dynamic configuration message, system information of the serving cell of the UE and/or dedicated radio resource control messages from the eNodeB to the UE.

Furthermore, when the methods are implemented in a wireless communications system according to the LTE standard, information that specifies Resource Element mapping of a Physical Downlink Shared Channel may include one or more of: the at least one muting configuration, information on a number of OFDM symbols occupied by a Physical Downlink Control Channel, TFREs occupied by CRS, and configured non-zero power CSI-RS. In some such embodiments, information that specifies Resource Element mapping of a Physical Downlink Shared Channel includes the at least one muting configuration together with one or more of: information on a number of OFDM symbols occupied by a Physical Downlink Control Channel, TFREs occupied by CRS, and configured non-zero power CSI-RS.

An effect of the methods is that link adaptation and CSI reporting is improved in the wireless system when the muting configurations of receiving nodes are brought in accordance with muting configurations applied at different transmission points from which the information carrying signal is transmitted to the receiving nodes.

In the above described methods "dynamic" should be interpreted as occurring substantially faster than e.g., a semi-static Radio Resource Control (RRC) re-configuration. A typical case is that the dynamic configuration is instantaneous and associated with a specific downlink allocation.

A muting configuration, e.g. a muting pattern may span multiple subframes, and may potentially be repeated cyclically. Moreover, the muted resource elements in such a muting pattern may not be present in every subframe, but for example, only occur in a single subframe that is repeated with a specific periodicity.

For such multi subframe muting patterns, it should be understood that if such a pattern is dynamically configured, then it should be assumed for the decoding of the received signal that the muting pattern corresponding to the subframe of the received signal should be applied.

It could also be considered to have muting patterns spanning a single subframe only, and the dynamic configuration of the muting pattern then corresponds to applying the single subframe muting pattern for decoding of the signal in the current subframe (or the subframe of an associated downlink assignment).

Further, a special example of a muting pattern is a pattern without any muting.

Muting of data/control may be implemented in different ways. One common way is to puncture the data transmission; that is, the data/control codeword is mapped as if there was no muting, and then the resource elements that should be muted are set to zero transmission power. Alternatively, the codeword is rate matched around (i.e., mapped around) the muted resource elements. The latter option has better performance, but cannot be decoded unless the UE fully knows the exact muting pattern. Hence, if the muting is punctured, it is sufficient that a UE "may assume" that the data is punctured since a different assumption is not catastrophic, i e does not have severe impact on the performance, whereas in case of rate matching a UE "shall assume" that the data is muted on the set of REs, since a different assumption results in catastrophic performance.

It should also be noted that said dynamic muting pattern typically not specify the complete resource element mapping of a data and/or control channel, e.g., the PDSCH. Other parameters impacting the RE mapping of a Physical Downlink Shared Channel (PDSCH) may include: The number of OFDM symbols occupied by the Physical Downlink Control Channel (PDCCH), the mapping of the CRS transmission (e.g., the PDSCH is not mapped onto TFREs occupied by the CRS), a configured non-zero power CSI-RS, etc.

In a first embodiment said dynamic muting configuration is completely determined by a dynamic indicator transmitted to the UE, system information of the serving cell of the UE, and/or dedicated radio resource control messages from the eNodeB to the UE; that is, the UE is not expected to decode any broadcasted system information of any neighboring cell to acquire said information.

In one embodiment said dynamic muting patterns or muting configurations are zero-power CSI-RS configurations.

In another embodiment said dynamic muting patterns may be limited to resource elements that may be configured as zero-power CSI-RS configurations.

In another embodiment, at least one of said dynamic muting configurations covers the TFREs of at least one CRS configuration.

This embodiment has the advantage that it is possible to dynamically mute the PDSCH on a specific CRS configuration. Hence, if the UE is dynamically scheduled between two transmission points with different CRS configurations, the UE may be informed not to receive the PDSCH on the TFREs where the neighbor transmission point is transmitting its CRS. This is particularly useful when the PDSCH transmission to the UE is originating from said neighboring transmission point.

In another embodiment, at least one of said dynamic muting configurations covers all TFREs of an OFDM symbol. In a special such case if where the at least one dynamic muting configuration covers all TFREs of the first N OFDM symbols. Typically N would be one, two, or three OFDM symbols, corresponding to the possible PDCCH regions of a neighboring cell.

This embodiment has the advantage that the UE can be instructed not to receive the PDSCH in the OFDM symbols where a neighboring transmission point that belong to a different cell is transmitting its PDCCH, which is highly useful when the transmission to said UE originates from said neighboring transmission point.

Dynamic muting patterns that are zero-power CSI-RS configurations has the advantage that also LTE Rel-10 terminals may be configured to be muted on the specific resources, since they are capable of zero-power CSI-RS configurations. Note also that Rel-10 UEs are not capable of multipoint CSI feedback, and are therefore likely not candidates for switching transmission points, and therefore it is sufficient to statically allocate a zero-power CSI-RS for these terminals.

In a further embodiment, the method further comprises receiving from an eNodeB a configuration message identifying an enumerated set of candidate muting patterns, and wherein said dynamic configuration indicates a specific subset of said enumerated candidate muting patterns, and wherein said dynamic muting pattern overlaps the union of said specific subset of candidate muting patterns.

In one such embodiment, at least one of said set of candidate muting patterns covers a zero-power CSI-RS configuration.

In one such embodiment, at least one of said set of candidate muting patterns covers the TFREs of a CRS configuration.

In another such embodiment, at least one of said set of candidate muting patterns covers all the TFREs of a OFDM symbol.

It should be understood that a special case of the above embodiment is where said specific subset contains (or is limited to) a single candidate muting pattern. We also note that in this context subset should not be limited to be a strict subset; that is, it could very well contain all of said enumerated candidate muting patterns.

In a further such embodiment, the dynamic muting pattern is the union of said specific subset of candidate muting patterns, and a static (or semi-static) muting pattern configured for the UE.

For example, a zero power (ZP) CSI-RS configuration could be configured for the UE, which covers resource elements that should be muted regardless of which transmission point (corresponding to resources in e.g., the CoMP Measurement Set) the transmission to the UE may occur from. On top of this common muting configuration, a dynamic part could be configured covering only the difference of the desired muting configurations of, for example, two different candidate transmission points.

In alternative embodiment, said dynamic muting patterns is determined as a configured static (or semi-static) muting pattern but where said dynamic configuration indicates a set of resource elements on which the data should not be muted, even if a muting is indicated by the static muting pattern, i.e., the dynamic no-muting configuration overrides the static muting configuration.

In one such embodiment the static muting pattern is an enumerated set of zero-power CSI-RS, as configured by parameters including zeroTxPowerResourceConfigList, and wherein said dynamic configuration identifies a bitmap, where each bit determines if a muting corresponding to a specific zero-power CSI-RS, as configured by zeroTxPowerResourceConfigList, should not be muted.

Alternatively, in another embodiment the dynamic muting pattern may be an enumerated set of zero-power CSI-RS, as configured by parameters including zeroTxPowerResourceConfigList, and the dynamic configuration message may identify a bitmap, where each bit determines if a specific zero-power CSI-RS, as configured by zeroTxPowerResourceConfigList, should be muted.

In another embodiment the UE is informed, by an eNodeB, of a plurality of desired muting patterns of a plurality of transmission nodes or points, and said dynamic configuration identifies a specific transmission node or point to receive said transmission.

Here, the concept of a "transmission hypothesis" corresponds to a specific allocation in terms of e.g., which transmission point is transmitting, and/or on which subframe the transmission occurs, and/or which subband the transmission occurs.

The embodiments of the invention provides a solution to freely construct the Interference composition on an IMR without any limitations imposed by UE specific muting configurations. Moreover, the interference measurements may be made to better reflect the performance when there is actual intra-cluster interference present without bias imposed by varying traffic load in the system.

This will translate to improved link adaptation and spectral efficiency in the wireless system.

Figure 9:
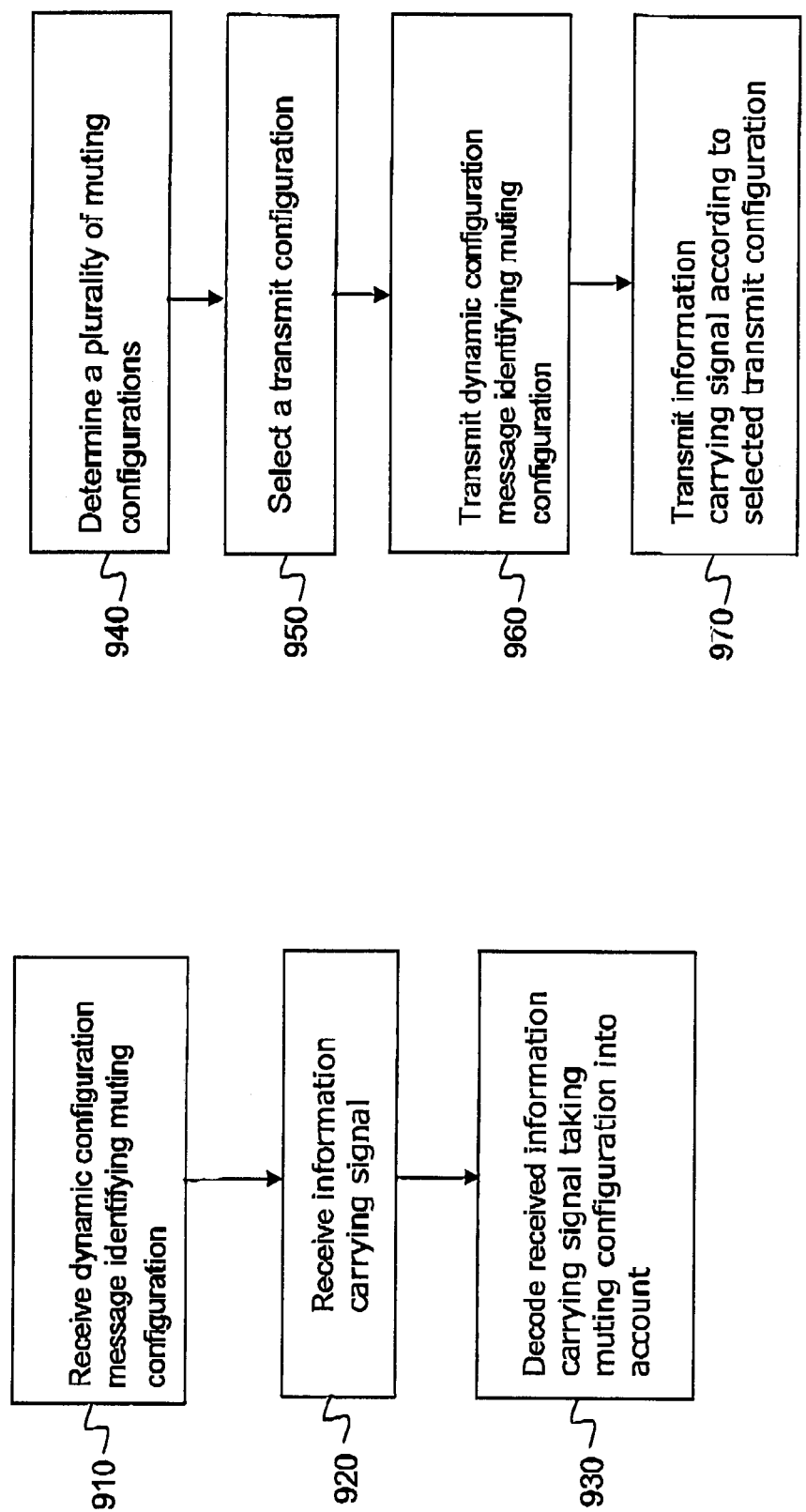
FIG. 9 depicts flow charts illustrating methods according to some embodiments.
Figure 10:
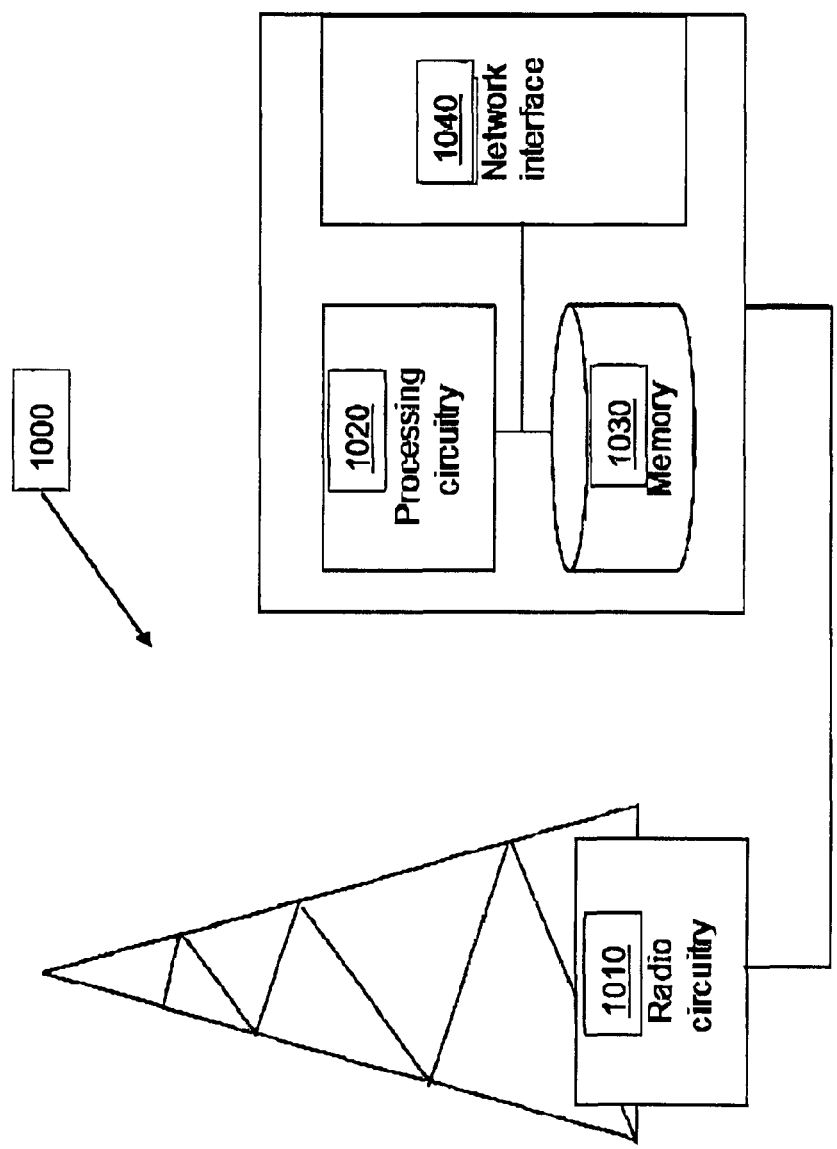
FIG. 10 is a block diagram illustrating a transmitting node according to some embodiments.
Figure 11:
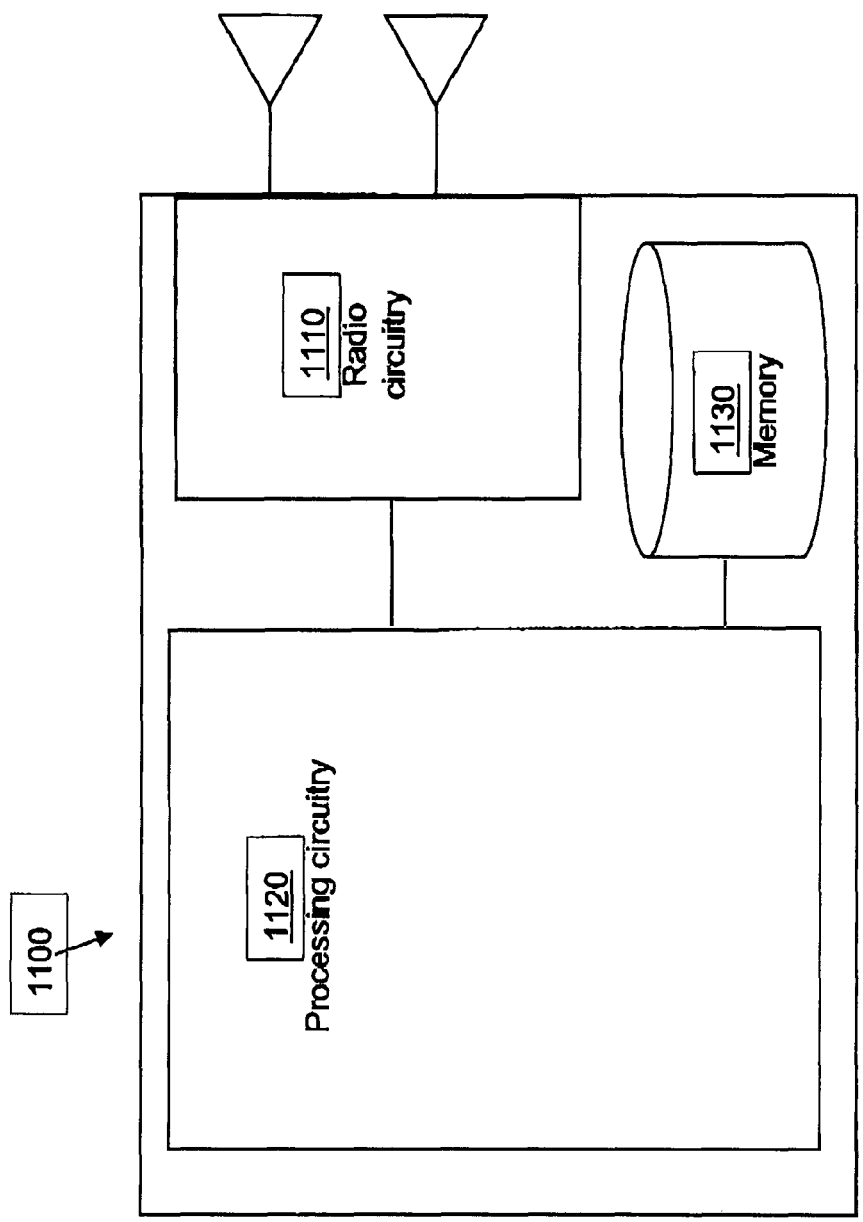
FIG. 11 is a block diagram illustrating a receiving node according to some embodiments.

FIGS. 10-11 illustrate devices configured to execute the methods described in relation to FIG. 9.

FIG. 10 illustrates a transmitting node 1000 for transmitting an information carrying signal to a receiving node 540. The transmitting node 1000 comprises processing circuitry 1020, and is configured to be connectable to radio circuitry 1010 for communicating with the receiving node 540 in a wireless communications system 500. A plurality of transmission configurations, also denoted transmit configurations, are available for transmitting the information carrying signal via the radio circuitry 1010 to the receiving node 540. The wireless communications system 500 may in some embodiments be configured to apply Coordinated Multipoint Transmission. The transmitting node 1000 may then be configured to provide for at least some of the plurality of transmission configurations by CoMP transmission. In some variants, the radio circuitry 1010 is comprised in the transmitting node 1000, whereas in other variants, the radio circuitry 1010 is external. For example, in the example scenario in FIG. 5, the transmitting node 560 corresponds to transmitting node 1000. The radio circuitry in this example resides in the distributed transmission points TP1-TP3, which are not physically co-located with transmitting node 560. However, in the example shown in FIG. 6, the transmission points correspond to sector antennas at the transmitting node, e.g. the eNodeB, and in this case the radio circuitry may be comprised in the transmitting node. The transmitting node 560, 1000 comprises a memory 1030, a network interface 1040 for communicating with network nodes and processing circuitry 1020.

The processing circuitry 1020 is configured to determine a plurality of muting configurations. Each muting configuration in the plurality of muting configurations corresponds to or may be associated with at least one transmission configuration in the plurality of transmission configurations. The plurality of muting configurations may comprise muting configurations that cover time-frequency resource elements (TFREs) that are zero-power CSI-RS configurable, i.e. which can be configured as zero-power CSI-RS configurations. Additionally or alternatively the plurality of muting configurations may comprise at least one muting configuration that covers TFREs of at least one CRS configuration. Furthermore, the plurality of muting configurations may comprise at least one muting configuration that covers all TFREs of an OFDM symbol. In some embodiments a muting configuration that covers TFREs that are zero-power CSI-RS configurable may in addition cover TFREs of at least one CRS configuration and/or all TFREs of an OFDM symbol.

The processing circuitry 1020 is further configured to select a transmission configuration from said plurality of transmission configurations for transmitting the Information carrying signal to the receiving node 540, and to transmit, to the receiving node 540 via the radio circuitry 1010, a dynamic configuration message identifying, to the receiving node 540, the at least one muting configuration out of said plurality of muting configurations that corresponds to or is associated with the selected transmission configuration. In some embodiments the processing circuitry 1020 may be configured to indicate the at least one muting configuration by an indicator in the dynamic configuration message. The indicator may comprise one or more bits in a Downlink Control Information, DCI, format. The at least one muting configuration may comprise a zero-power Channel State Information Reference Signal, CSI-RS, configuration. According to some embodiments the at least one muting configuration may additionally or alternatively cover TFREs of at least one Cell Specific Reference Signal, CRS, configuration and/or all TFREs of an Orthogonal Frequency Division Multiplexing, OFDM, symbol. Further, according to some embodiments the processing circuitry 1020 may be configured to transmit the dynamic configuration message identifying the at least one muting configuration in a current subframe in which the at least one muting configuration is intended to be applied by the receiving node 540 for decoding of the information carrying signal. In some examples the at least one muting configuration may be a dynamic muting pattern of time-frequency resource elements on which the receiving node 640 may assume that a data end/or control signal is not transmitted. In such examples, the muting pattern is dynamic in that the processing circuitry 1020 may be configured to adjust the muting pattern to match a desired muting pattern for one or more specific transmission points that are transmitting to the receiving node 540 in a given instance. The given instance may be a current subframe in which the processing circuitry 1020 is configured to transmit the dynamic configuration message and in which the muting pattern is to be applied by the receiving node 540 for decoding of the information carrying signal.

In addition, the processing circuitry 1020 is configured to transmit, via the radio circuitry 1010, the information carrying signal to the receiving node 540 in a transmission according to the selected transmission configuration. The transmission is muted in accordance with the identified at least one muting configuration. The processing circuitry 1020 may be configured to transmit the information carrying signal in a coordinated transmission via radio circuitry 1010 at one or more transmission points 510, 520, 530. The transmission points may in some embodiments be controlled by the transmitting node 1000. In other embodiments, at least one of the one or more transmission points may be controlled by a neighboring transmitting node. The coordinated transmission may in some embodiments be a Coordinated Multi-Point transmission. The information carrying signal may be a downlink data and/or control signal.

In an alternative realization of the transmitting node 1000, the transmitting node 1000 may comprise several functional units which can be implemented in hardware, software, firmware or any combination thereof. In an embodiment, the transmitting node 1000 includes: a determining unit configured to determine the plurality of muting configurations, a selection unit configured to select the transmission configuration from said plurality of transmission configurations and a transmit unit configured to transmit the dynamic configuration message identifying the at least one muting configuration and the information carrying signal to the receiving node 540. The further details of the configurations of these functional units are in accordance with what has been described for the corresponding functions in relation to the processing circuitry 1020.

FIG. 11 shows a receiving node 1100 for receiving an information carrying signal from a transmitting node 560. The receiving node comprises a memory 1130, radio circuitry 1110 and processing circuitry 1120 and is configurable to communicate with the transmitting node 560 in a wireless communications system 500. A plurality of transmission configurations, also denoted transmit configurations, are available for transmitting the information carrying signal to the receiving node 1100. The wireless communications system 500 may in some embodiments be configured to apply Coordinated Multipoint Transmission. The receiving node 1100 may then be configured to expect at least some of the plurality of transmit configurations to be provided for by CoMP transmission. The receiving node 1100 may be configured for or capable of feeding back CSI for CoMP transmission.

The processing circuitry 1120 is configured to receive from the transmitting node 560 via the radio circuitry 1110 a dynamic configuration message that identifies, to the receiving node 540, 1100, at least one muting configuration among a plurality of possible muting configurations. The plurality of muting configurations may comprise muting configurations that cover time-frequency resource elements (TFREs) that are zero-power CSI-RS configurable, i.e. which can be configured as zero-power CSI-RS configurations. Additionally or alternatively the plurality of muting configurations may comprise at least one muting configuration that covers TFREs of at least one CRS configuration. Furthermore, the plurality of muting configurations may comprise at least one muting configuration that covers all TFREs of an OFDM symbol. In some embodiments a muting configuration that covers TFREs that are zero-power CSI-RS configurable may in addition cover TFREs of at least one CRS configuration and/or all TFREs of an OFDM symbol.

In some embodiments the processing circuitry 1120 may be configured to identify the at least one muting configuration by an indicator in the dynamic configuration message. The indicator may comprise one or more bits in a Downlink Control Information, DCI, format. The at least one muting configuration may comprise a zero-power Channel State Information Reference Signal, CSI-RS, configuration. According to some embodiments the at least one muting configuration may additionally or alternatively cover TFREs of at least one Cell Specific Reference Signal, CRS, configuration and/or all TFREs of an Orthogonal Frequency Division Multiplexing, OFDM, symbol.

The processing circuitry 1120 is further configured to receive the information carrying signal from the transmitting node 560 via said radio circuitry 1110. The processing circuitry 1120 may be configured to receive the information carrying signal from the transmitting node 560 in a coordinated transmission via one or more transmission points 510, 520, 530. The transmission points may in some embodiments be controlled by the transmitting node 560. In other embodiments, at least one of the one or more transmission points may be controlled by a neighboring transmitting node. The coordinated transmission may in some embodiments be a Coordinated Multi-Point transmission. The information carrying signal may for example be a downlink data and/or control transmission.

The processing circuitry 1120 is further configured to decode the received Information carrying signal taking the at least one muting configuration into account by assuming that no information expected to be decoded by the receiving node 540, 1100 is transmitted on Time-Frequency Resource Elements, TFREs, identified as muted by said at least one muting configuration. According to some embodiments the processing circuitry 1120 may be configured to receive the dynamic configuration message identifying the at least one muting configuration from the transmitting node 560 in a current subframe in which the at least one muting configuration is to be applied by the receiving node 1100 for decoding of the information carrying signal. The at least one muting configuration may in some examples be a dynamic muting pattern of time-frequency resource elements on which the processing circuitry 1120 may be configured to assume that a data and/or control signal is not transmitted. In such examples, the muting pattern is dynamic in that it is a muting pattern that has been adjusted by the transmitting node 560 to match a desired muting pattern for one or more specific transmission points that are transmitting to the receiving node 1100 in a given instance. The given instance may be a current subframe in which the dynamic configuration message is received from the transmitting node 560 and in which the muting pattern is applied for decoding of the information carrying signal.

In an alternative realization of the receiving node 1100, the receiving node 1100 may comprise several functional units which can be implemented in hardware, software, firmware or any combination thereof. In an embodiment, the receiving node 1100 includes: a receiving unit configured to receive the dynamic configuration message and to receive the information carrying signal and a decoding unit configured to decode the received information carrying signal taking the at least one muting configuration into account. The further details of the configurations of these functional units are in accordance with what has been described for the corresponding functions in relation to the processing circuitry 1120.

The processing circuitry 1020, 1120 may comprise one or several microprocessors, digital signal processors, and the like, as well as other digital hardware and a memory. The memory, which may comprise one or several types of memory such as read-only memory (ROM), random-access memory, cache memory, flash memory devices, optical storage devices, etc., stores program code for executing one or more telecommunications and/or data communications protocols and for carrying out one or more of the techniques described herein. The memory further stores program data and user data received from the receiving node.

Not all of the steps of the techniques described herein are necessarily performed in a single microprocessor or even in a single module.

It should be noted that although terminology from 3GPP LTE has been used in this disclosure to exemplify the invention, this should not be seen as limiting the scope of the invention to only the aforementioned system. Other wireless systems, including Wideband Code Division Multiple Access (WCDMA), Worldwide interoperability for Microwave Access (WiMax), Ultra Mobile Broadband (UMB) and Global System for Mobile Communications (GSM), may also benefit from exploiting the ideas covered within this disclosure.

When using the word "comprise" or "comprising" it shall be interpreted as non-limiting, i.e. meaning "consist at least of".

The present invention is not limited to the above-described preferred embodiments. Various alternatives, modifications and equivalents may be used. Therefore, the above embodiments should not be taken as limiting the scope of the invention, which is defined by the appended claims.

The invention claimed is:

1. A method in a receiving node for receiving an information carrying signal that is transmitted to the receiving node by a transmitting node in a wireless communications system, wherein a plurality of transmission configurations are available for transmitting said information carrying signal to said receiving node, the method comprising:
   receiving from the transmitting node a dynamic configuration message that identifies, to said receiving node, at least one muting configuration among a plurality of possible muting configurations, the at least one muting configuration corresponding to a transmission configuration selected from said plurality of transmission configurations by the transmitting node for the transmission of said information carrying signal to said receiving node;
   receiving said information carrying signal from the transmitting node; and
   decoding said received information carrying signal taking said at least one muting configuration into account by assuming that no information expected to be decoded by the receiving node is transmitted on Time-Frequency Resource Elements, TFREs, identified as muted by said at least one muting configuration,
   wherein the at least one muting configuration identified in the dynamic configuration message received from the transmitting node in a current subframe is applied for decoding of the information carrying signal in the current subframe.

2. The method according to claim 1, wherein the at least one muting configuration is identified by an indicator in the dynamic configuration message.

3. The method according to claim 2, wherein the indicator comprises one or more bits in a Downlink Control Information, DCI, format.

4. The method according to claim 2, wherein the receiving node is a User Equipment, UE, served by a serving cell and the transmitting node is an eNodeB and wherein the at least one muting configuration is determined from the indicator received in the dynamic configuration message, system information of the serving cell of the UE, or dedicated radio resource control messages from the eNodeB to the UE.

5. The method according to claim 1, wherein the at least one muting configuration comprises a zero-power Channel State Information Reference Signal, CSI-RS, configuration.

6. The method according to claim 5, wherein the at least one muting configuration covers TFREs of at least one Cell Specific Reference Signal, CRS, configuration, or all TFREs of an Orthogonal Frequency Division Multiplexing, OFDM, symbol.

7. The method according to claim 1, wherein the plurality of muting configurations comprises muting configurations that cover TFREs that are zero-power CSI-RS configurable.

8. The method according to claim 7, wherein the plurality of muting configurations comprises at least one muting configuration that covers TFREs of at least one CRS configuration.

9. The method according to claim 7, wherein the plurality of muting configurations comprises at least one muting configuration that covers all TFREs of an OFDM symbol.

10. The method according to claim 1, wherein the at least one muting configuration is a muting pattern of TFREs that is adjusted to match a desired muting pattern for one or more specific transmission points that are transmitting to the receiving node in the current subframe.

11. The method according to claim 1, wherein the information carrying signal is received from the transmitting node in a coordinated transmission via one or more transmission points.

12. The method according to claim 11, wherein the coordinated transmission is a Coordinated Multi-Point transmission.

13. The method according to claim 1, wherein the receiving node is a User Equipment, UE, served by a serving cell and the transmitting node is an eNodeB and wherein information that specifies Resource Element mapping of a Physical Downlink Shared Channel includes one or more of: the at least one muting configuration, information on a number of OFDM symbols occupied by a Physical Downlink Control Channel, TFREs occupied by Cell Specific Reference Signal, CRS, and configured non-zero power CSI-RS.

14. A method in a transmitting node for transmitting an information carrying signal to a receiving node in a wireless communications system, wherein a plurality of transmission configurations are available for transmitting said information carrying signal to said receiving node, the method comprising:
   determining a plurality of muting configurations, each muting configuration in said plurality of muting configurations corresponding to at least one transmission configuration in said plurality of transmission configurations;
   selecting a transmission configuration from said plurality of transmission configurations for transmitting said information carrying signal to said receiving node;
   transmitting to said receiving node a dynamic configuration message identifying, to said receiving node, at least one muting configuration out of said plurality of muting configurations that corresponds to said selected transmission configuration; and
   transmitting said information carrying signal to said receiving node in a transmission according to said selected transmission configuration, wherein the transmission is muted in accordance with the identified at least one muting configuration,
   wherein the at least one muting configuration identified in the dynamic configuration message transmitted by the transmitting node in a current subframe is to be applied by the receiving node for decoding of the information carrying signal in the current subframe.

15. The method according to claim 14, wherein the at least one muting configuration is identified by an indicator in the dynamic configuration message.

16. The method according to claim 15, wherein the indicator comprises one or more bits in a Downlink Control Information, DCI, format.

17. The method according to claim 15, wherein the receiving node is a User Equipment, UE, served by a serving cell and the transmitting node is an eNodeB and wherein the at least one muting configuration is determined by the indicator transmitted in the dynamic configuration message, system information of the serving cell of the UE, or dedicated radio resource control messages from the eNodeB to the UE.

18. The method according to claim 14, wherein the at least one muting configuration comprises a zero-power Channel State Information Reference Signal, CSI-RS, configuration.

19. The method according to claim 18, wherein the at least one muting configuration covers TFREs of at least one Cell Specific Reference Signal, CRS, configuration, or all TFREs of an Orthogonal Frequency Division Multiplexing, OFDM, symbol.

20. The method according to claim 14, wherein the plurality of muting configurations comprises muting configurations that cover TFREs that are zero-power CSI-RS configurable.

21. The method according to claim 20, wherein the plurality of muting configurations comprises at least one muting configuration that covers TFREs of at least one CRS configuration.

22. The method according to claim 20, wherein the plurality of muting configurations comprises at least one muting configuration that covers all TFREs of an OFDM symbol.

23. The method according to claim 14, wherein the at least one muting configuration is a muting pattern of TFREs that is adjusted to match a desired muting pattern for one or more specific transmission points that are transmitting to the receiving node in the current subframe.

24. The method according to claim 14, wherein the information carrying signal is transmitted by the transmitting node in a coordinated transmission via one or more transmission points.

25. The method according to claim 24, wherein the coordinated transmission is a Coordinated Multi-Point transmission.

26. The method according to claim 14, wherein the receiving node is a User Equipment, UE, served by a serving cell and the transmitting node is an eNodeB and wherein information that specifies resource element mapping of a Physical Downlink Shared Channel includes one or more of: the at least one muting configuration, information on a number of OFDM symbols occupied by a Physical Downlink Control Channel, TFREs occupied by Cell Specific Reference Signal, CRS, and configured non-zero power CSI-RS.

27. A receiving node for receiving an information carrying signal from a transmitting node, the receiving node being configurable to communicate with the transmitting node in a wireless communications system wherein a plurality of transmission configurations are available for transmitting said information carrying signal to said receiving node, the receiving node comprising:
   radio circuitry;

processing circuitry configured to receive from the transmitting node via said radio circuitry a dynamic configuration message that identifies, to said receiving node, at least one muting configuration among a plurality of possible muting configurations, the at least one muting configuration corresponding to a transmission configuration selected from said plurality of transmission configurations by the transmitting node for the transmission of said information carrying signal to said receiving node, the processing circuitry configured to receive said information carrying signal from the transmitting node via said radio circuitry, and to decode said received information carrying signal taking said at least one muting configuration into account by assuming that no information expected to be decoded by the receiving node is transmitted on Time-Frequency Resource Elements, TFREs, identified as muted by said at least one muting configuration, wherein the at least one muting configuration identified in the dynamic configuration message received from the transmitting node in a current subframe is applied for decoding of the information carrying signal in the current subframe.

28. A transmitting node for transmitting an information carrying signal to a receiving node, the transmitting node being configured to be connectable to radio circuitry for communicating with the receiving node in a wireless communications system, wherein a plurality of transmission configurations are available for transmitting said information carrying signal via said radio circuitry to said receiving node, the transmitting node comprising:

processing circuitry configured to determine a plurality of muting configurations, each muting configuration in said plurality of muting configurations corresponding to at least one transmission configuration in said plurality of transmission configurations, and to select a transmission configuration from said plurality of transmission configurations for transmitting said information carrying signal to said receiving node, the processing circuitry further configured to transmit, to said receiving node via said radio circuitry, a dynamic configuration message identifying, to said receiving node, at least one muting configuration out of said plurality of muting configurations that corresponds to said selected transmission configuration, and to transmit, via said radio circuitry, the information carrying signal to said receiving node in a transmission according to the selected transmission configuration, wherein the transmission is muted in accordance with the identified at least one muting configuration, wherein the at least one muting configuration identified in the dynamic configuration message transmitted by the transmitting node in a current subframe is to be applied by the receiving node for decoding of the information carrying signal in the current subframe.

29. The transmitting node according to claim 28, wherein the radio circuitry is comprised in the transmitting node.

* * * * *

UNITED STATES PATENT AND TRADEMARK OFFICE
CERTIFICATE OF CORRECTION

PATENT NO.      : 9,532,333 B2
APPLICATION NO. : 14/395275
DATED           : December 27, 2016
INVENTOR(S)     : Hammarwall It is certified that error appears in the above-identified patent and that said Letters Patent is hereby corrected as shown below:

In the Specification

In Column 3, Line 11, delete "vector a" and insert -- vector s --, therefor.

In Column 12, Line 24, delete "IMR3 880" and insert -- IMR3 860 --, therefor.

In Column 13, Line 24, delete "a g" and insert -- e.g. --, therefor.

In Column 15, Line 34, delete "receiving node 640" and insert -- receiving node 540 --, therefor.

In Column 15, Line 60, delete "CoMP cluster 800" and insert -- CoMP cluster 600 --, therefor.

In Column 16, Line 18, delete "receiving node 640" and insert -- receiving node 540 --, therefor.

In Column 16, Line 27, delete "CBI-RS" and insert -- CSI-RS --, therefor.

In Column 17, Line 34, delete "transmitting node 550." and insert -- transmitting node 560. --, therefor.

In Column 21, Line 52, delete "receiving node 640" and insert -- receiving node 540 --, therefor.

In Column 21, Line 53, delete "end/or" and insert -- and/or --, therefor.

Signed and Sealed this
Twelfth Day of September, 2017

Joseph Matal
*Performing the Functions and Duties of the
Under Secretary of Commerce for Intellectual Property and
Director of the United States Patent and Trademark Office*